(12) United States Patent
Beiro et al.

(10) Patent No.: US 12,441,493 B2
(45) Date of Patent: Oct. 14, 2025

(54) PAYLOAD SUPPORT FRAME FOR UNMANNED AERIAL SYSTEM

(71) Applicant: BEIROBOTICS LLC, Richmond, VA (US)

(72) Inventors: Michael Kenneth Beiro, Richmond, VA (US); Alvin Leroy Corbin, Dillwyn, VA (US); Chase Hamilton Coble, North Chesterfield, VA (US); David Carson Schul, Richmond, VA (US)

(73) Assignee: LINEBIRD, INC., Richmond, VA (US)

( * ) Notice: Subject to any disclaimer, the term of this patent is extended or adjusted under 35 U.S.C. 154(b) by 118 days.

(21) Appl. No.: 18/379,991

(22) Filed: Oct. 13, 2023

(65) Prior Publication Data

US 2024/0034489 A1    Feb. 1, 2024

Related U.S. Application Data

(63) Continuation-in-part of application No. 17/735,111, filed on May 2, 2022, now Pat. No. 11,952,119.
(Continued)

(51) Int. Cl.
*B64U 20/00* (2023.01)
*B64U 10/16* (2023.01)
(Continued)

(52) U.S. Cl.
CPC .............. *B64U 20/00* (2023.01); *B64U 10/16* (2023.01); *H02G 1/02* (2013.01); *B64U 2101/26* (2023.01)

(58) Field of Classification Search
CPC .... B64U 20/00; B64U 10/16; B64U 2101/26; H02G 1/02; B64D 1/22
See application file for complete search history.

(56) References Cited

U.S. PATENT DOCUMENTS

| 4,378,949 A | 4/1983 | Smith |
| 4,478,312 A | 10/1984 | Kurtgis |

(Continued)

FOREIGN PATENT DOCUMENTS

| FR | 2656730 A1 | 7/1997 |
| FR | 3055419 A1 | 3/2018 |

(Continued)

OTHER PUBLICATIONS

U.S. Patent and Trademark Officce, International Search Report and Written Opinion issued Oct. 5, 2022 which pertains to PCT Application No. PCT/US2022/027481. 13 pages.
(Continued)

*Primary Examiner* — Lee E Rodak
*Assistant Examiner* — Zannatul Ferdous
(74) *Attorney, Agent, or Firm* — Thompson Hine LLP

(57) ABSTRACT

An apparatus, system, and/or method for carrying a power line device from an aircraft, such as an unmanned aerial vehicle (UAV), and for performing work on electrical power lines and/or splices on electrical power lines. The apparatus or system may include an attachment flange selectively and releasably coupled to the aircraft, a payload support frame selectively and releasably coupled to the attachment flange, an intermediary frame selectively and releasably coupled to the payload support frame, and a base frame selectively and releasably coupled to the power line device. The payload support frame may include at least three elongated rigid segments, each including a hollow elongated pole, at least three upper flexible segments, each at an upper end of a corresponding rigid segment, and at least three lower flexible segments, each at a lower end of a corresponding rigid segment.

19 Claims, 14 Drawing Sheets

Related U.S. Application Data

(60) Provisional application No. 63/184,668, filed on May 5, 2021.

(51) Int. Cl.
  *B64U 101/26*   (2023.01)
  *H02G 1/02*    (2006.01)

(56) References Cited

U.S. PATENT DOCUMENTS

| | | | |
|---|---|---|---|
| 4,673,059 | A | 6/1987 | Kurtgis |
| 5,417,304 | A | 5/1995 | Kurtgis |
| 8,794,380 | B2 | 8/2014 | Glenn, Jr. et al. |
| 10,613,429 | B1 | 4/2020 | Wingo et al. |
| 11,608,169 | B2 * | 3/2023 | Beiro ............... B64D 1/22 |
| 12,060,151 | B2 * | 8/2024 | Beiro ............... B64D 1/22 |
| 2016/0023761 | A1 | 1/2016 | McNally |
| 2017/0029104 | A1 | 2/2017 | Kim |
| 2017/0240277 | A1 | 8/2017 | Molnar et al. |
| 2017/0316701 | A1 | 11/2017 | Gil et al. |
| 2020/0317336 | A1 | 10/2020 | Beiro et al. |
| 2022/0355930 | A1 | 11/2022 | Beiro et al. |

FOREIGN PATENT DOCUMENTS

| | | |
|---|---|---|
| KR | 2004-40322 Y1 | 6/2008 |
| WO | 2018/094514 A1 | 5/2018 |

OTHER PUBLICATIONS

Matrice 600PRO from DJI, available at https://www.dji.com/matrice600-pro, last accessed Feb. 27, 2020, 4 pages.

Ohmstik Plus from SensorLink, available at https://sensorlink.com/products/ohmstik, last accessed Feb. 27, 2020, 9 pages.

Payload Drop System for DJI Matrice 600/Pro from Rise Above Custom Drones & Robotics, last accessed Feb. 27, 2020, 6 pages.

Snap-Together Cable and Hose Carrier from McMaster-Carr, available at https://www.mcmaster.com/4516t47, last accessed Feb. 27, 2020, 1 page.

Drone X-Ray Power Line Inspections—Better, Faster, Safer, Talon Aerolytics, Inc., Aug. 29, 2017, available at https://www.talon.io/talon-launches-x-ray-technology-aimed-electric-power-industries/, last accessed Mar. 29, 2020, 4 pages.

Commissioner for Patents, International Search Report and Written Opinion, issued Feb. 13, 2024, which pertains to PCT Application No. PCT/US2024/050949. 17 pgs.

Industrial Splicing and Spacing Worksheet-110a—Selection and Application of Shackles. Feb. 13, 2014. 2 pgs. https://irp-cdn.multiscreensite.com.

European Patent Office, Extended European Search Report issued Jan. 22, 2025, which pertains to EP Application No. 22799434. 9 pgs.

\* cited by examiner

PAYLOAD SUPPORT FRAME FOR UNMANNED AERIAL SYSTEM

CROSS-REFERENCE TO RELATED APPLICATIONS

This application is a continuation-in-part of pending Ser. No. 17/735,111, filed May 2, 2022, which claims priority to Ser. No. 63/184,668, filed May 5, 2021, the contents of which are incorporated herein by reference in its entirety. This application is also related to U.S. Provisional Application Ser. No. 62/830,371, filed Apr. 6, 2019, Ser. No. 62/934,487, filed Nov. 12, 2019, U.S. Provisional Application Ser. No. 62/978,446, filed Feb. 19, 2020, and pending U.S. patent application Ser. No. 16/838,745, filed Apr. 2, 2020, the contents of which are incorporated herein by reference in their entirety.

FIELD OF THE INVENTION

This invention relates generally to electric power lines and more particularly to systems and methods for monitoring components of same.

BACKGROUND

It is sometimes necessary to inspect or monitor the components of electric power lines, or to make repairs or otherwise perform work on such power lines. For some power lines these components are often located high above the ground, making them difficult to access to perform any needed inspection or repair.

SUMMARY

In one embodiment of the invention, a payload support frame adapted to suspend a payload from an unmanned aerial vehicle (UAV) during flight includes at least one elongated rigid segment, at least one upper flexible segment at an upper end of the rigid segment, and at least one lower flexible segment at a lower end of the rigid segment. One or more of (a) the at least one rigid segment, (b) the at least one upper flexible segment, or (c) the at least one lower flexible segment include a dielectric material. The at least one upper flexible segment is adapted to be selectively attachable, directly or indirectly, to the UAV. The at least one lower flexible segment is adapted to be selectively attachable, directly or indirectly, to the payload.

The at least one rigid segment may include at least three rigid segments. The at least one upper flexible segment may include at least three upper flexible segments, each at an upper end of a corresponding rigid segment. The at least one lower flexible segment may include at least three lower flexible segments, each at a lower end of a corresponding rigid segment.

Each of the at least three rigid segments may include an elongated pole. Each of the at least three upper flexible segments may include a rope, cable, or wire. Each of the at least three lower flexible segments may include a rope, cable, or wire. Each of the elongated poles may be hollow. Each of the at least three upper flexible segments and corresponding ones of each of the at least three lower flexible segments each may include a single rope, cable, or wire extending through a corresponding one of the elongated poles. The elongated poles each may include one or more telescoping pole segments.

The frame may further include a rigid upper spacer frame configured to hold the at least three upper flexible segments, and thereby the upper ends of the corresponding rigid segments, in a spaced-apart arrangement. The frame may further include a rigid lower spacer frame configured to hold the at least three lower flexible segments, and thereby the lower ends of the corresponding rigid segments, in a spaced-apart arrangement.

The at least three upper flexible segments may include at least three first upper flexible segments. The at least three lower flexible segments may include at least three first lower flexible segments. The frame may further include at least three second upper flexible segments and at least three second lower flexible segments. Each of the at least three second upper flexible segments may be on an opposite side of the upper spacer frame from a corresponding one of the at least three first upper flexible segments. Each of the at least three second lower flexible segments may be on an opposite side of the lower spacer frame from a corresponding one of the at least three first lower flexible segments. Each of the at least three second upper flexible segments and a corresponding one of the at least three first upper flexible segments may include a single rope, cable, or wire extending through a corresponding channel in the rigid upper spacer frame. Each of the at least three second lower flexible segments and a corresponding one of the at least three first lower flexible segments may include a single rope, cable, or wire extending through a corresponding channel in the rigid lower spacer frame.

In one embodiment of the invention, an apparatus includes an attachment flange selectively and releasably coupled to a UAV, a payload support frame selectively and releasably coupled to the attachment flange, wherein the payload support frame includes at least three elongated rigid segments, each elongated rigid segment including a hollow elongated pole, at least three upper flexible segments, each upper flexible segment positioned at an upper end of a corresponding rigid segment, and at least three lower flexible segments, each lower flexible segment positioned at a lower end of a corresponding rigid segment, an intermediary frame selectively and releasably coupled to the payload support frame via the at least three lower flexible segments, wherein the intermediary frame is coupled to a power line device at one or more points, wherein the power line device is configured to measure one or more properties of an electrical power line and/or a splice on the electrical power line, and a base frame selectively and releasably coupled to the power line device.

These and other embodiments can each optionally include one or more of the following features.

In some embodiments of the invention, each upper flexible segment of the at least three upper flexible segments and each corresponding lower flexible segment of the at least three lower flexible segments include a single rope, cable, or wire and are coupled to a corresponding one of the elongated poles.

In some embodiments of the invention, each of the elongated poles include one or more interconnecting pole segments. In some embodiments of the invention, a length of each elongated pole is adjusted based on removing, replacing, or adding one or more of the interconnecting pole segments. In some embodiments of the invention, a length of each elongated pole is configured to be adjusted based on an electromagnetic field of an energized electrical power line.

In some embodiments of the invention, the base frame includes at least two guide bars. In some embodiments of the invention, the guide bars each include of one or more segments, wherein at least a portion of each segment is hollow. In some embodiments of the invention, each of the one or more segments include a nonferrous weighted material inside the hollow portion. In some embodiments of the invention, the guide bars are selectively and releasably coupled to the power line device via cotter pins.

In some embodiments of the invention, the attachment flange includes at least three attachment points, and wherein the at least three upper flexible segments each include an attachment component configured to selectively and releasably connect to one of the at least three attachment points of the attachment flange.

In some embodiments of the invention, the apparatus further includes a rigid upper spacer frame configured to hold the at least three upper flexible segments, and thereby the upper ends of the corresponding rigid segments, in a spaced-apart arrangement, and a rigid lower spacer frame configured to hold the at least three lower flexible segments, and thereby the lower ends of the corresponding rigid segments, in a spaced-apart arrangement.

In some embodiments of the invention, the at least three upper flexible segments include at least three first upper flexible segments, and the at least three lower flexible segments include at least three first lower flexible segments, and the apparatus further includes at least three second upper flexible segments, each of the at least three second upper flexible segments on an opposite side of the upper spacer frame from a corresponding one of the at least three first upper flexible segments, and at least three second lower flexible segments, each of the at least three second lower flexible segments on an opposite side of the lower spacer frame from a corresponding one of the at least three first lower flexible segments, where each of the at least three second upper flexible segments and a corresponding one of the at least three first upper flexible segments include a single rope, cable, or wire extending through a corresponding channel in the rigid upper spacer frame and where each of the at least three second lower flexible segments and a corresponding one of the at least three first lower flexible segments include a single rope, cable, or wire extending through a corresponding channel in the rigid lower spacer frame.

In some embodiments of the invention, the at least three upper flexible segments and the at least three lower flexible segments include a dielectric material.

In one embodiment of the invention, a method for contact inspection of electrical power lines and/or splices on energized electrical power lines. The method includes attaching a power line tool to an unmanned aerial vehicle (UAV) to a payload support apparatus via an attachment flange, wherein the power line tool is adapted to perch on an electrical power line and/or a splice on an electrical power line and wherein the payload support apparatus is selectively releasably attached, directly or indirectly, to the UAV, piloting the UAV to a position adjacent to and at an altitude that is higher than an energized electrical power line and/or a splice on the electrical power line upon which it is desired to perch the power line tool, reducing the altitude of the UAV to lower the power line tool onto the power line and/or the splice such that the power line tool is perched on the power line and/or the splice, and obtaining, by an electronic device, measurement data from the power line tool, where the payload support apparatus includes the attachment flange, a payload support frame coupled to the attachment flange, an intermediary frame coupled to the payload support frame, and a base frame coupled to the power line tool.

These and other embodiments can each optionally include one or more of the following features.

In some embodiments of the invention, the payload support frame includes at least three elongated rigid segments, each elongated rigid segment including a hollow elongated pole, at least three upper flexible segments, each upper flexible segment positioned at an upper end of a corresponding rigid segment, and at least three lower flexible segments, each lower flexible segment positioned at a lower end of a corresponding rigid segment.

In some embodiments of the invention, each upper flexible segment of the at least three upper flexible segments and each corresponding lower flexible segment of the at least three lower flexible segments include a single rope, cable, or wire and are coupled to a corresponding one of the elongated poles.

In some embodiments of the invention, each of the elongated poles include one or more interconnecting pole segments. In some embodiments of the invention, a length of each elongated pole is adjusted based on removing, replacing, or adding one or more of the plurality of interconnecting pole segments, and the length is configured to be adjusted based on an electromagnetic field of an energized electrical power line.

In some embodiments of the invention, the method further includes reducing the altitude of the UAV to introduce slack into one or more of the at least three upper flexible segments, one or more of the at least three lower flexible segments, or a combination thereof.

In some embodiments of the invention, the base frame includes at least two guide bars and that each include of one or more segments, wherein at least a portion of each segment is hollow and includes a nonferrous weighted material inside the hollow portion.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Reference will now be made to the accompanying drawings, which are not necessarily drawn to scale. The following detailed description of the disclosure will be better understood when read in conjunction with the appended drawings. It should be understood, however, that the disclosure is not limited to the precise arrangements and instrumentalities shown. In the drawings, like reference numerals are used to indicate like parts in the various views.

DETAILED DESCRIPTION

Figure 1:
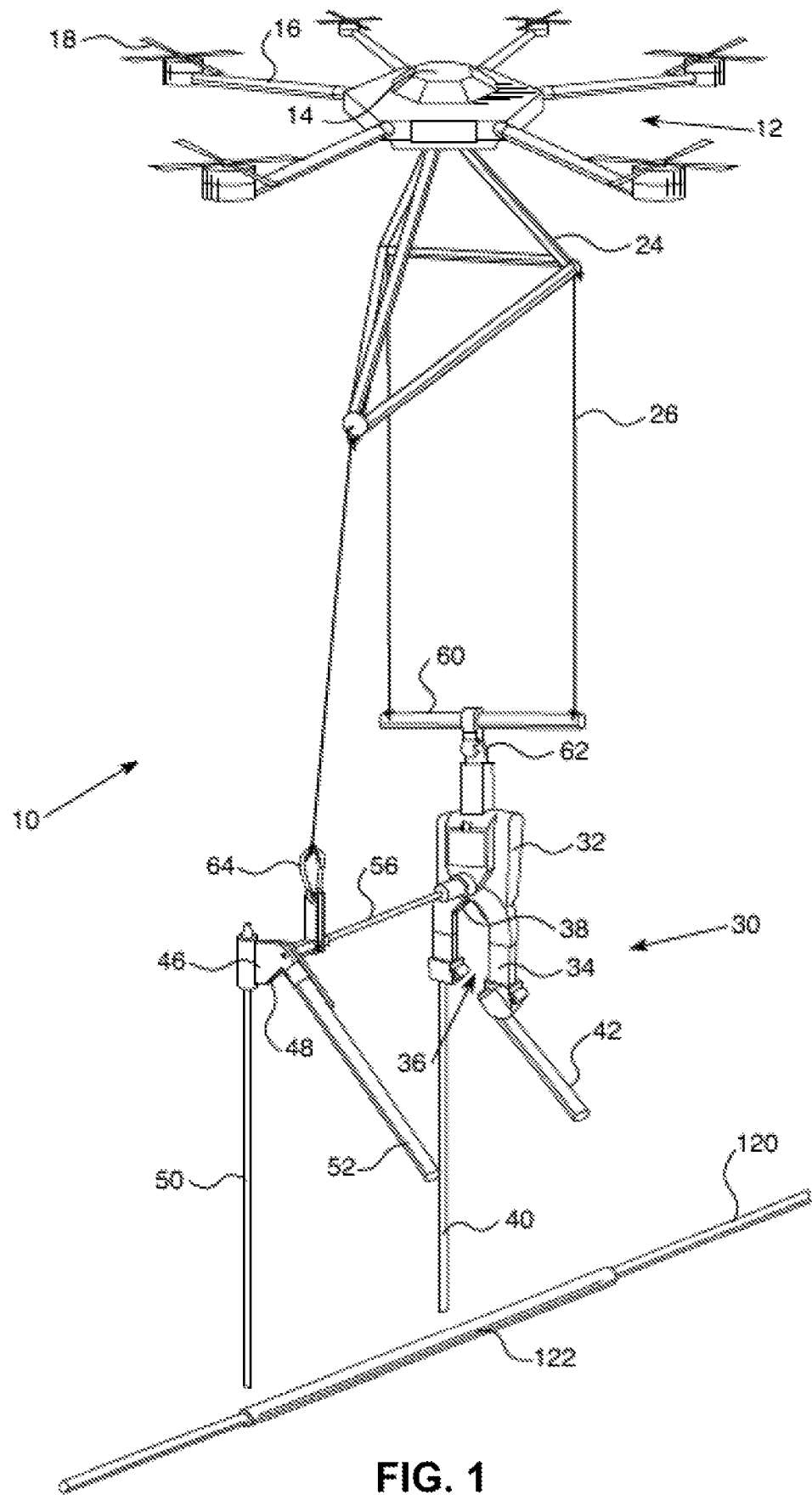
FIG. 1 is a perspective view of a system for contact inspection of electrical power lines, on approach to a power line, in accordance with embodiments of the invention.
Figure 2:
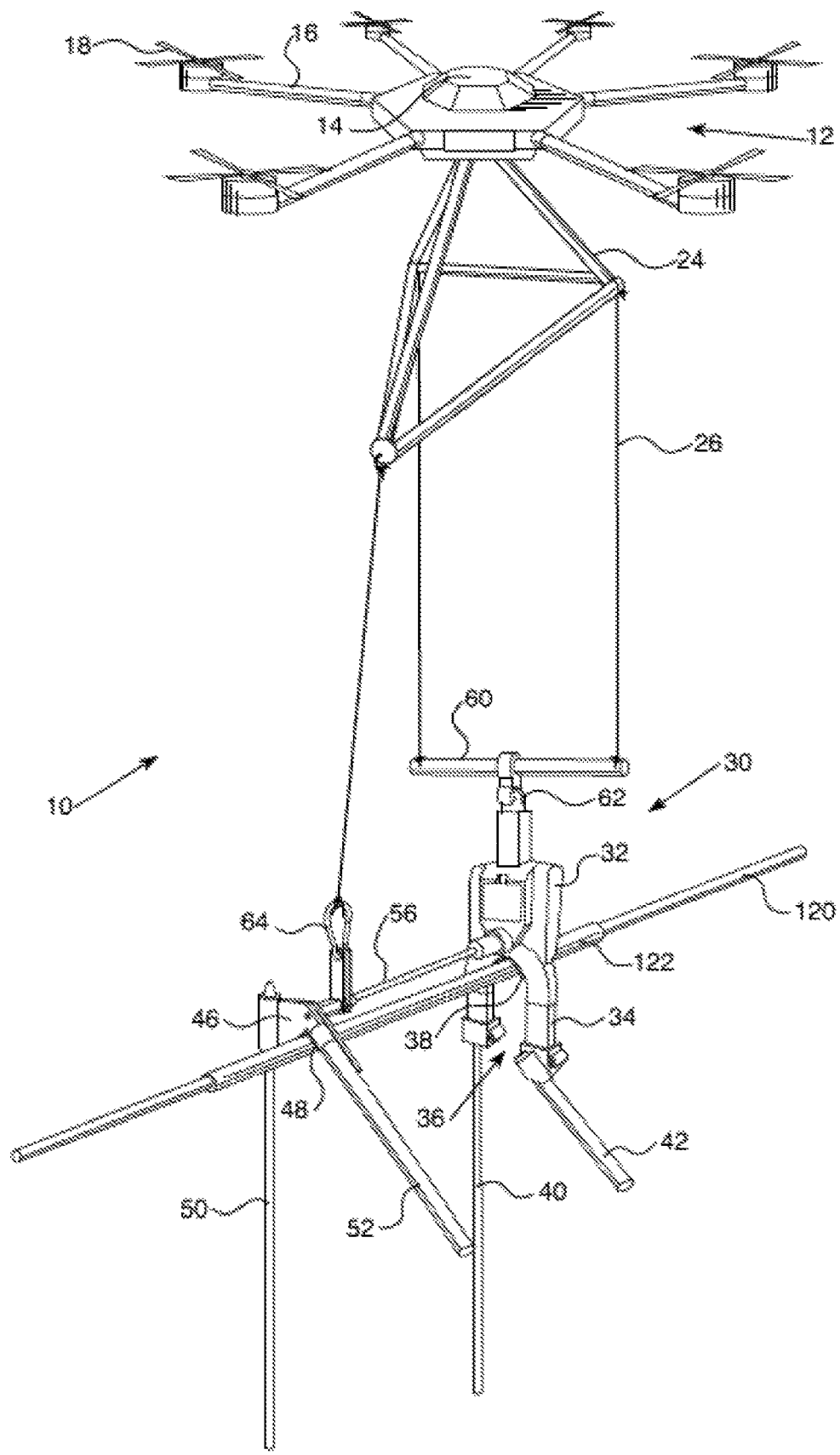
FIG. 2 is a perspective view of the system of FIG. 1, in contact with the power line.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

In the world of power line inspection, one of the most critical components of a conductor line is the sleeve, which joins two lengths of cable and can repair over existing cracks and breaks in the line. These sleeves, called "splices," have often been installed incorrectly in previous decades due to poor oversight of third-party contractors performing maintenance operations and as a result can fail to the point that they break apart in some instances, causing serious problems on the power grid. Currently inspection of these components is done via infrared thermography and contact resistance measurement. Infrared provides more quantitative data about where a problem exists, while resistance provides more qualitative information about an anomaly once it has been isolated. Resistance is a much less convenient and more dangerous method as it conventionally requires manned crews in telescoping or flying vehicles to make contact with high voltage lines.

As they are a common failure point, maintaining and diagnosing splices of breaks between lines includes a large portion of the work done to maintain grid health. Currently unmanned aerial surveillance (UAS) technology allows for easy visual and infrared inspection of lines, but checking splice resistance and health requires either a bucket truck or a helicopter and bringing a lineman close to high voltage lines to physically make contact with the splice. This work can be extremely expensive and dangerous.

Embodiments of the present invention provide a solution for taking resistance measurements of high voltage lines using unmanned aerial vehicles (UAVs, often called drones), greatly reducing the manpower, cost, liability, and time to check splices. The methodology can be further expanded to enable other contact live-line work conducted through unmanned systems. Embodiments of the invention can drastically change the way power lines are inspected and maintained.

Embodiments of the invention provide a much safer and more cost-effective solution. As described herein, embodiments of the present invention encompass systems and method for outfitting a UAV with the tools required to take measurements of splices remotely while a technician watches and controls the craft from the ground. Such systems and methods can trivialize the liability, labor, and monetary costs associated with splice inspection, and allow for more efficient and thorough checking of the electrical grid to better foresee and prevent failures. In some exemplary embodiments of the invention, a commercially available drone is outfitted with a Radio OhmStik or equivalently functioning tool to take resistance measurements on live conductor wire. Given the prevalence, affordability, and variety of drones on the market, this can yield an inexpensive solution for a costly problem, and while the immediate savings in maintenance costs will be valuable, the increase in grid reliability will yield exponentially greater dividends. While a typical inspection run can require as many as three workers and over thirty minutes for one mission, a drone would allow one inspector and one supervisor to deploy, position, record, and leave the site in just fifteen minutes.

Embodiments of the invention are directed to systems and methods for using a UAV to deliver and land a tool or similar device on an electrical power line and/or on a splice on an electrical power line, while the UAV maintains flight and does not itself land on the power line and/or splice. Such a tool may include a contact inspection tool, such as an OhmStik™ from SensorLink Corporation that reads microOhm resistances on high-voltage connections. Other suitable inspection tools may be used by embodiments of the invention. Other suitable tools for repairing or otherwise performing work on an electrical power line and/or on a splice may be used by embodiments of the invention. Such tools are collectively referred to herein as "power line tools."

The term "power line" as used herein is intended to include any line, wire, cable, etc. in a power grid through which electricity flows, regardless of the voltage carried by the line and whether such a line, wire, cable, etc. might be conventionally considered part of a transmission system, distribution system, or any other portion of a power grid. In this regard, embodiments of the invention may be used to perform work on any elevated electricity-carrying line, wire, cable, etc.

Importantly and notably, embodiments of the invention are adapted to perform work on energized power lines, that is, power lines that are conducting electricity while the work is being performed. There is no need to shut down the power lines to perform work using embodiments of the invention. Not having to shut down the power lines is a significant benefit in that shutting down a power line, especially a high-voltage power line, is time-consuming and costly.

Referring now to the figures, a system 10 for performing work (including contact inspection, repair, or any other suitable work tasks that may be performed) on an electrical power line 120 and/or a splice 122 on the electrical power line 120 is illustrated in accordance with an exemplary embodiment of the invention. The system 10 includes an unmanned aerial vehicle (UAV) 12, a power line tool 30 adapted to perch on the power line 120 and/or the splice 122, a support frame 24 selectively releasably attached to the UAV 12, and a plurality of flexible dielectric support lines 26 (three are shown, although more or fewer may be used;

however fewer cables may not provide stable support for the tool 30 during flight) attaching the power line tool 30 to the support frame 24. Each of the support lines 26 is attached to a corresponding attachment point on the support frame 24 and a corresponding attachment point on the power line tool 30.

The UAV may be any suitable remotely piloted aircraft, typically multi-rotor, with sufficient payload capacity to carry the support frame, support lines, and power line tool. In the illustrated embodiment, UAV 12 includes a main body 14 and six rotors 18 supported by corresponding rotor support arms 16 (any suitable number of rotors may be used). In one exemplary embodiment of the invention, the UAV includes a Matrice 600 Pro Hexacopter from DJI. As is conventionally known, the UAV 12 is controlled in flight by an operator or pilot using a controller (not illustrated). The UAV will typically have retractable landing gear (not illustrated)

In the illustrated embodiment, the support frame 24 is generally pyramidal, providing two front attachment points and one rear attachment point for the support lines 26. However, any suitable support frame structure may be used. Having at least three attachment points provides more stability to the tool during flight than having only one or two attachment points. The number, position, and arrangement of the attachment points may vary. The support lines may be attached to the support frame in any suitable manner or with any suitable mechanism, and may be removably attached or fixedly attached. The support frame may be constructed from any suitable non-conductive material or combination of non-conductive materials that is sufficiently strong, sufficiently rigid, and sufficiently lightweight, such a suitable polymer, a glass-epoxy composite, or the like.

Figure 3:
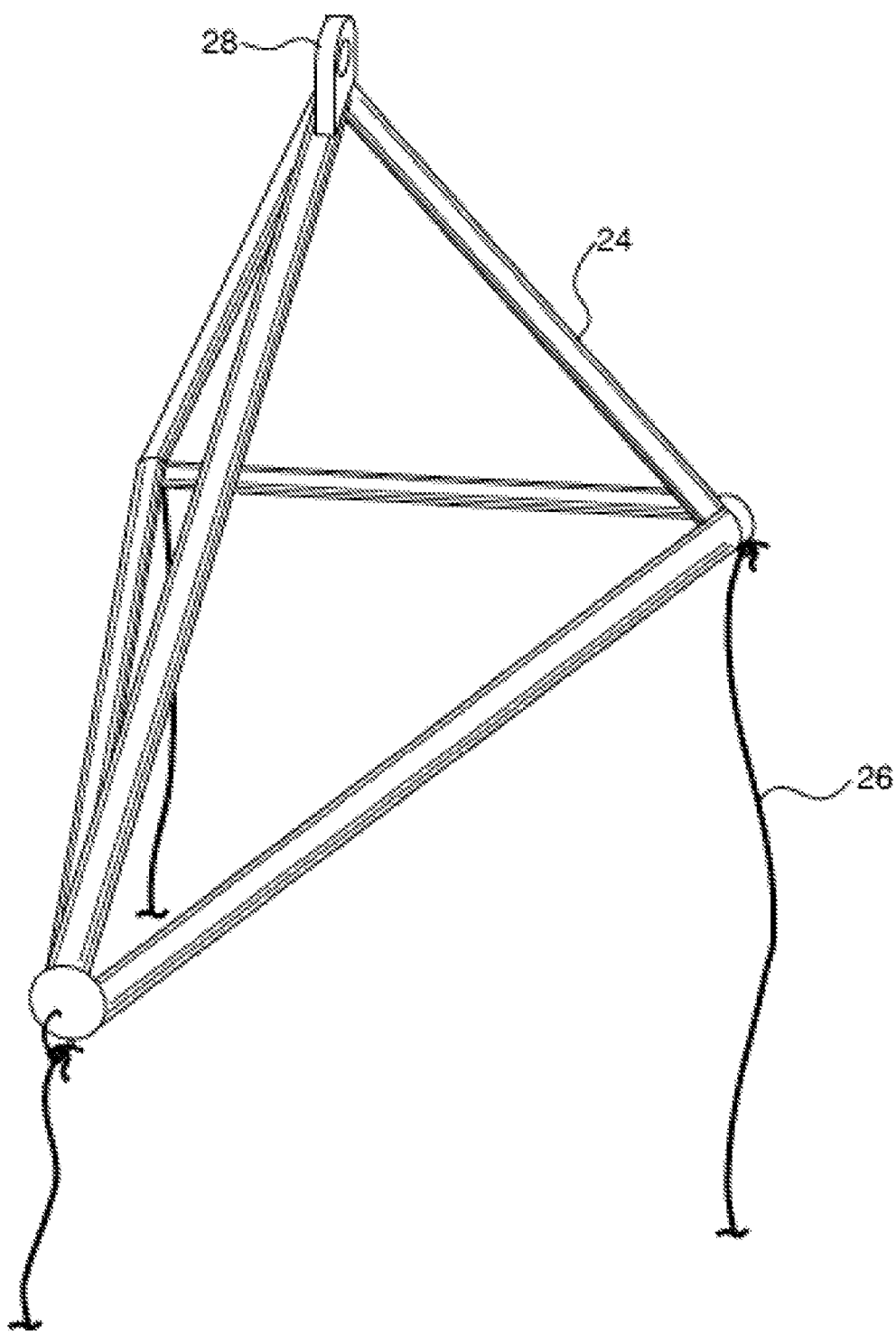
FIG. 3 is a perspective view of a support frame of the system of FIG. 1.
Figure 4:
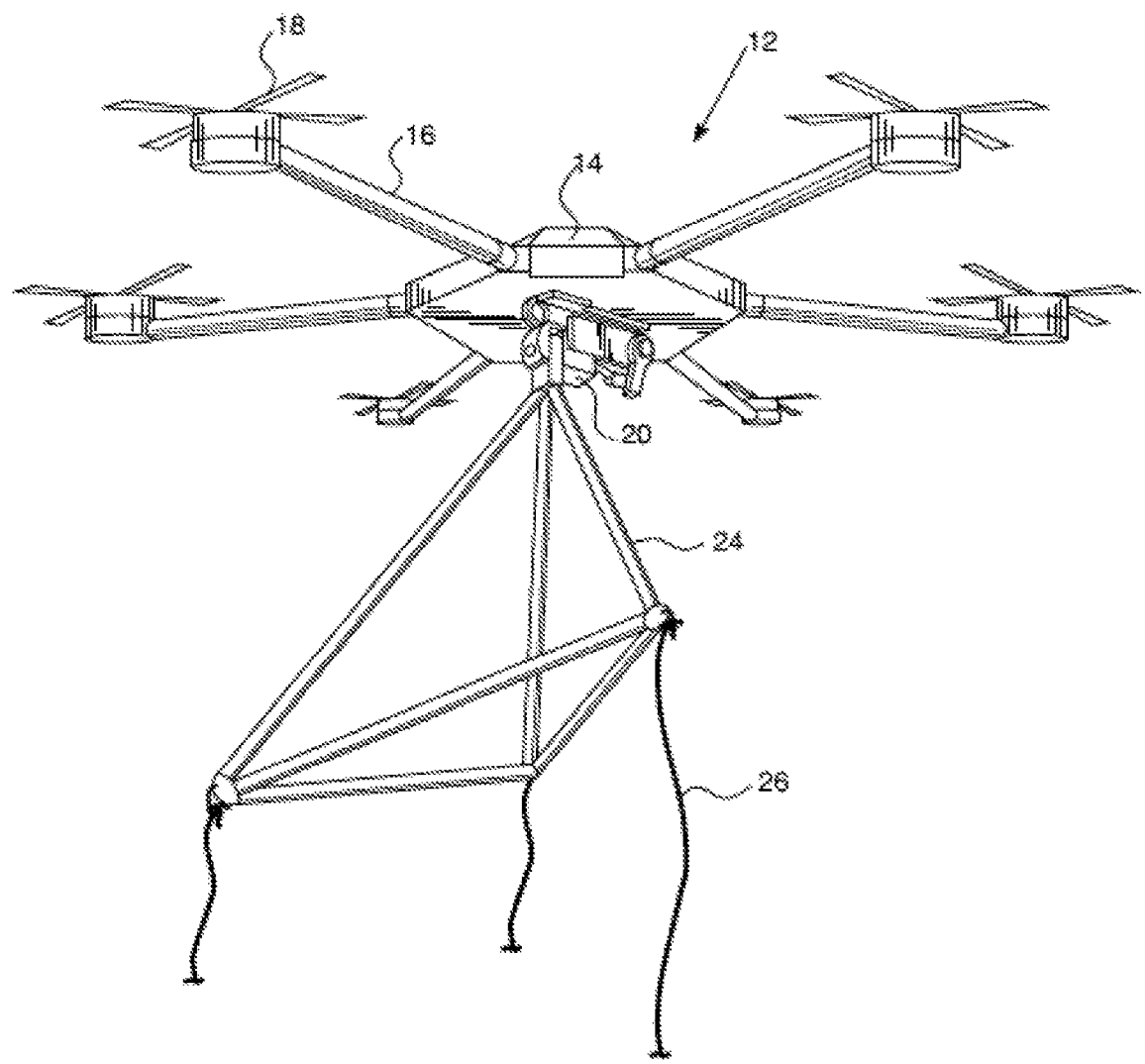
FIG. 4 is a bottom perspective view of a portion of the system of FIG. 1.

As seen in FIG. 3, the support frame 24 has a UAV attachment flange 28. The UAV attachment flange 28 is generally aligned with the central front-to-back axis of the support frame. The UAV attachment flange 28 mates with a payload release mechanism 20 (shown in FIG. 4) that is mounted to the underside of the main body 14 of the UAV 12 to enable releasable attachment of the support frame 24 to the UAV 12. In one exemplary embodiment of the invention, the payload release mechanism 20 includes the Payload Drop System: Heavy Duty from Rise Above Custom Drones & Robotics, but any suitable payload release mechanism may be used. The payload release mechanism 20 has a movable pin that selectively engages with the hole in the UAV attachment flange 28. The pin engages with the hole in the UAV attachment flange 28 to couple the support frame 24 and the UAV 12 during normal operation of the system and disengages to release the support frame 24 from the UAV 12 at the end of a mission (described further below) or in an emergency (described further below). The thickness of the UAV attachment flange 28 is selected to enable the support frame 24 to pitch relative to the UAV but to somewhat limit yaw and roll of the support frame 24 relative to the UAV as the UAV 12 pitches, yaws, and rolls during flight (some yaw and roll of the support frame is acceptable to limit yaw and roll of the support frame from transferring to the UAV). The payload release mechanism 20 is controlled by the UAV operator.

The support lines may include any suitably strong and flexible material, such as ropes (natural or synthetic), metallic cables, wires, etc. In one exemplary embodiment of the invention, the support lines include Hy-Dee-Brait Hot Rope from Yale Cordage. The material selected for the support lines is typically a non-conductive (dielectric) material to prevent electricity from being conducted up the support lines to the UAV. Although it may be possible to electrically shield the critical components of the UAV, it is typically desirable that the length of the support lines 26 be long enough to maintain a sufficient distance between the UAV and the power line to prevent damage to the UAV from the electromagnetic fields surrounding such high-voltage power lines. In this regard, the length of the support lines 26 may be selected based on the voltage of the power line upon which the tool 30 is to be perched (based on the live-line work approach distances set forth in the National Electrical Safety Code). For example, if the voltage of the power line is 145 kilovolts (kV), then the length of the support lines 26 should be at least five feet, four inches to maintain the desired spacing between the UAV and the power line. As another example, if the voltage of the power line is 362 kV, then the length of the support lines 26 should be at least thirteen feet, six inches. Additionally, the UAV should be a minimum of twenty feet from the highest structure point (which may be a shield or static line) when working on a line. In most cases there is some charge in the shield line which runs above the energized phases, so the UAV should be kept above those.

Importantly, in systems and methods of embodiments of the invention, the power line tool that is suspended from the UAV is lowered onto a power line and/or splice while the UAV hovers safely apart from the power line and preferably outside of the electromagnetic field. The power line tool may include any suitable tool for inspecting, repairing, or otherwise performing work on a power line, splice, or other component of a high voltage electrical power system. In the illustrated embodiment, the power line tool includes a contact inspection tool, such as an OhmStik™ from SensorLink Corporation.

The contact inspection tool 30 of embodiments of the invention has a front section 32, a rear section 46, and an elongated middle section 56 therebetween. Each of the front and rear sections 32, 46 have a generally U-shaped portion 34, the U-shaped portion 34 of the front section 32 being more substantial and forming a gap 36. Each of the front and rear sections 32, 46 have an electrical contact portion 38, 48 (respectively) that contacts the electrical power line 120 and/or the splice 122 when the contact inspection tool 30 is perched on the power line 120 and/or the splice 122. The conventional OhmStik includes elements 32, 34, 36, 38, 48, and 56 only.

The contact inspection tool 30 of embodiments of the invention typically further includes a first elongated guide 40 extending substantially vertically downward from a first side of the front section 32, a second elongated guide 42 extending downward and outward from a second side of the front section 32, a first elongated guide 50 extending substantially vertically downward from a first side of the rear section 46, and a second elongated guide 52 extending downward and outward from a second side of the rear section 46. These guides 40, 42, 50, 52 help guide the contact inspection tool 30 into the correct position as the contact inspection tool 30 is lowered onto the power line 120 and/or the splice 122 (i.e., such that the tool 30 rests on the power line 120 and/or the splice 122 with the electrical contact portions 38, 48 in contact with the power line 120 and/or the splice 122). In the embodiment of FIGS. 1-5, the first and second elongated guides of each of the front and rear sections of the contact inspection tool include a rigid pole.

In order for the power line tool to perch stably on the power line, the center of gravity of the power line tool must be lower than the power line upon which the power line tool is perched. The weight of the guides 40, 42, 50, 52 helps lower the center of gravity of the tool 30. The guides 40, 42, 50, 52 may be constructed of any suitable non-conductive material or combination of non-conductive materials that is sufficiently strong and sufficiently rigid, such a suitable polymer, a glass-epoxy composite, or the like. In one exemplary embodiment of the invention, the second guides 42, 52 define hollow cavities into which a ballast material (e.g., sand) may be placed to increase the weight of the second guides 42, 52 as needed to appropriately lower the center of gravity of the tool 30.

As described above, it is preferable that there are at least three support lines between the support frame and the power line too. In the illustrated embodiment, there are two attachment points on the front section 32 of the tool 30 and one attachment point on the rear section 46 of the tool 30. The front two support lines attach to the front section 32 of the tool 30 via a crossbar 60. The crossbar 60 is attached to the front section 32 of the tool 30 via an adapter 62. The adapter 62 may be adjustable to pivot the crossbar 60 forward or rearward as needed. The rear support line attaches to the rear section 46 of the tool 30 via carabiner connector 64. However, the support lines may be attached to the power line tool using any suitable mechanism(s).

Embodiments of the invention may further include a ground perch 70 (illustrated in FIG. The ground perch is for receiving the power line tool thereupon after completion of a mission (as described further below). In the illustrated embodiment, the ground perch 70 includes a landing bar 72 supported by opposing upright support structures 76, 86. The landing bar 72 has an electrically conductive portion 73 and may optionally have an electrically non-conductive portion 74. In the illustrated embodiment, the conductive portion 73 is supported by support structure 76 via support bracket 78, and the non-conductive portion 74 is support by support structure 86 via support bracket 88.

The upright support structures 76, 86 will typically include a tripod having adjustable legs 90 (respectively) to enable the landing bar 72 to be positioned substantially horizontally even when the ground perch 70 is installed on uneven ground. The legs 80, 90 will typically have feet 82, 92 (respectively) that are shaped to enable the feet 82, 92 to be readily pushed into the ground to limit movement of the support structures 76, 86 and therefore of the ground perch 70.

The electrically conductive portion 73 of the landing bar 72 is electrically connected to a ground wire and/or a ground rod. Because an electrical charge may have built up on the tool 30 during the mission, it is desirable to dissipate this charge at the end of the mission before any person touches the tool 30. When the tool 30 is received upon the electrically conductive portion 73 of the landing bar 72, the electrical charge dissipates through the electrically conductive portion 73 of the landing bar 72 and the ground wire/rod into the ground. In the illustrated embodiment, the ground wire 84 is at least partially contained within one leg 80 of the support structure 76. The ground wire 84 is electrically connected at one end to the support bracket 78 (which is electrically conductive) and at the other end to the foot 82 (which is electrically conductive).

The electrically conductive portion 73 of the landing bar 72, the support bracket 78, and the feet 82 may be constructed out of any suitable material or combination of materials that provides the desired strength, rigidity, and durability and that is electrically conductive, such as any suitable metal or metal alloy. The non-conductive portion 74 of the landing bar 72 may be constructed out of any suitable non-conductive material or combination of non-conductive materials that provides the desired strength, rigidity, and durability and that is electrically non-conductive, such a suitable polymer, a glass-epoxy composite, or the like. In the illustrated embodiment, the feet that do not connect to the ground wire 84 do not need to be constructed out of conductive material but would likely be constructed out of a suitable metal or metal alloy to provide the desired strength, rigidity, and durability. In the illustrated embodiment, the support bracket 86 does not need to be constructed out of conductive material but would likely be constructed out of a suitable metal or metal alloy to provide the desired strength, rigidity, and durability. The legs 80, 90 of the support structures 76, 86 may be constructed out of any suitable material or combination of materials that provides the desired strength, rigidity, and durability. Similar tripods used for surveying often have legs that are constructed of wood.

In alternative embodiments of the invention, the non-conductive portion 74 of the landing bar 72 may be omitted such that the entire landing bar 72 is conductive. In such alternative embodiments, there may also be a path to ground (e.g., ground wire, etc.) in support structure 86.

Figure 5:
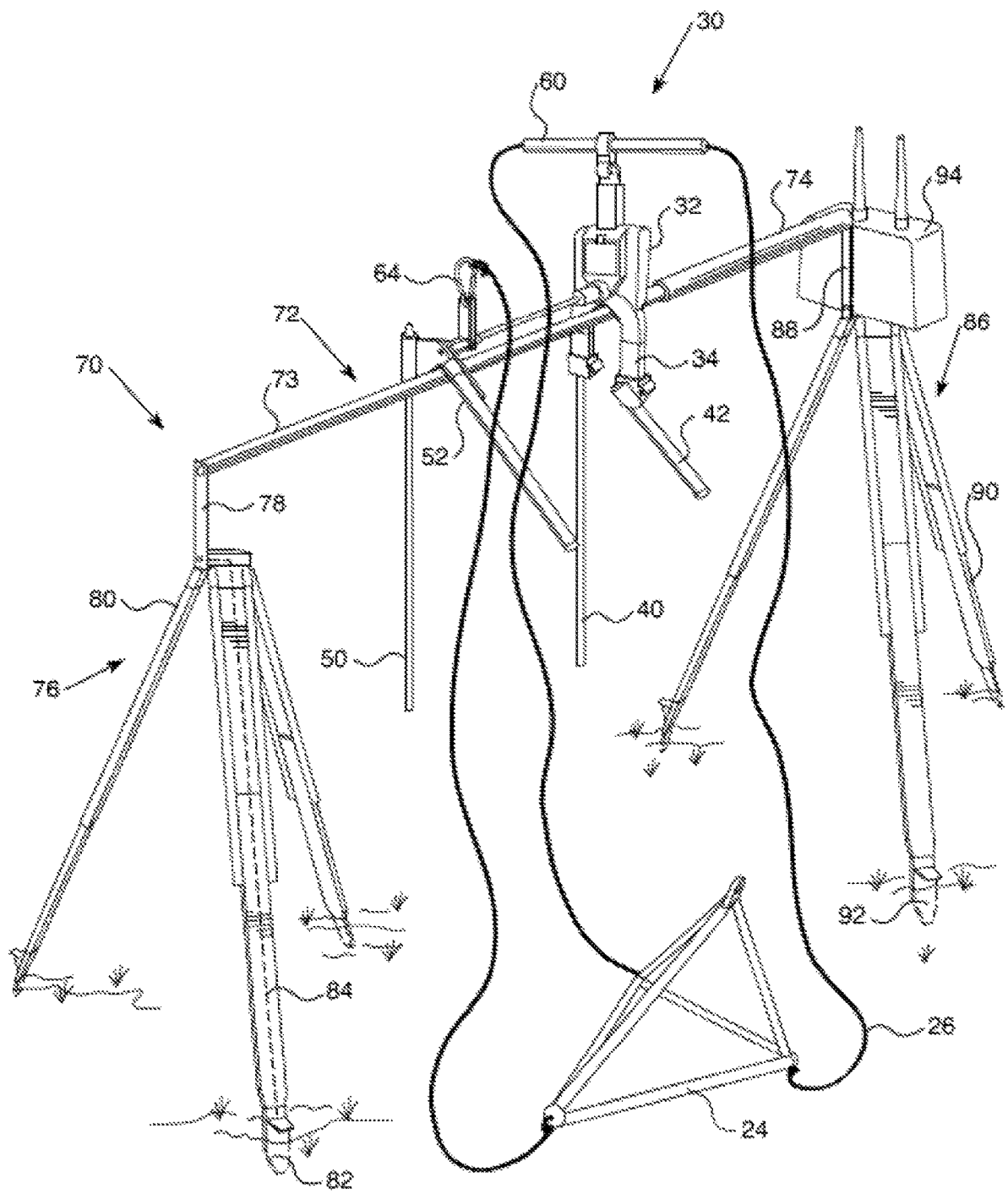
FIG. 5 is a perspective view of the system of FIG. 1, having landed on a perch of embodiments of the invention.

Due to electromagnetic interference from the power lines, the controller may have difficulty communicating with the UAV. As such, it may be desirable to utilize a conventional ground control station to enhance communications with the UAV. FIG. 5 shows such a ground control station 94 mounted to one of the support structures 86 for convenience. If such a ground control station is mounted to one of the support structures, the ground control station should be mounted to the support structure that is supporting the non-conductive portion of the landing bar. If the landing bar does not include a non-conductive portion, then the ground control station should be mounted in such a way as to ensure that the ground control station is electrically isolated.

Figure 6:
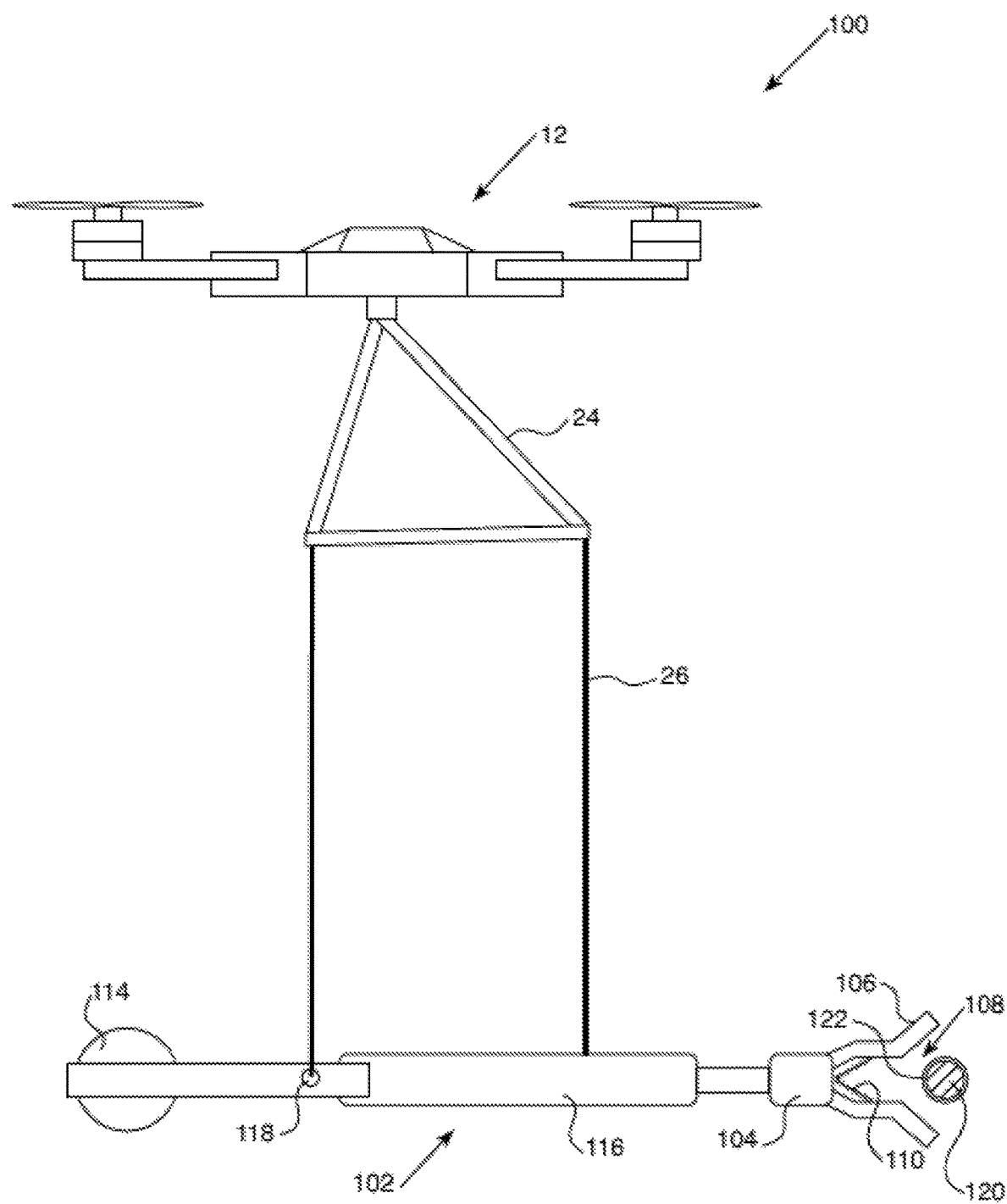
FIG. 6 is a side view of a system for contact inspection of electrical power lines, on approach to a power line, in accordance with alternative embodiments of the invention.

Referring now to FIG. 6, a system 100 for performing work (including contact inspection, repair, or any other suitable work tasks that may be performed) on an electrical power line 120 and/or a splice 122 on the electrical power line 120 is illustrated in accordance with an alternative exemplary embodiment of the invention. The system 100 of FIG. 6 provides for a lateral approach to the power line rather than an approach from above. The system 100 includes a UAV 12, a support frame 24 selectively releasably attached to the UAV 12, and a plurality of flexible dielectric support lines 26 (although only two are visible in FIG. 6, the system of FIG. 6 includes three support cables) attached to the support frame 24, as in the embodiment of FIGS. 1-5. The system 100 of FIG. 6 includes a tool assembly 102 that is generally horizontal during use. The tool assembly 102 includes an elongated support bar 116. Any suitable tool may be affixed to one end of the support bar 116. In the illustrated embodiment, the tool is similar to tool 30 of the embodiment of FIGS. 1-5 in that the tool has a first end 104 with a generally U-shaped portion 106 forming a gap 108 and having an electrical contact portion 110 (the second end is not visible in FIG. 6). A gyroscopic stabilizing device 114 (similar to those used to stabilize video cameras) is attached to the other end of the support bar 116. The stabilizing device 114 helps limit movement of the tool assembly 102 during use, which helps the pilot initiate and maintain contact between the tool and the power line and/or splice. In an alternative embodiment, a counterweight may be used to stabilize the device instead of such a gyroscopic device to enable the attachment of three cables to the tool assembly 102, a crossbar 118 may extend perpendicularly from the support bar 116 such that two of the support cables can be attached to opposing ends of the crossbar 118.

Figure 7:
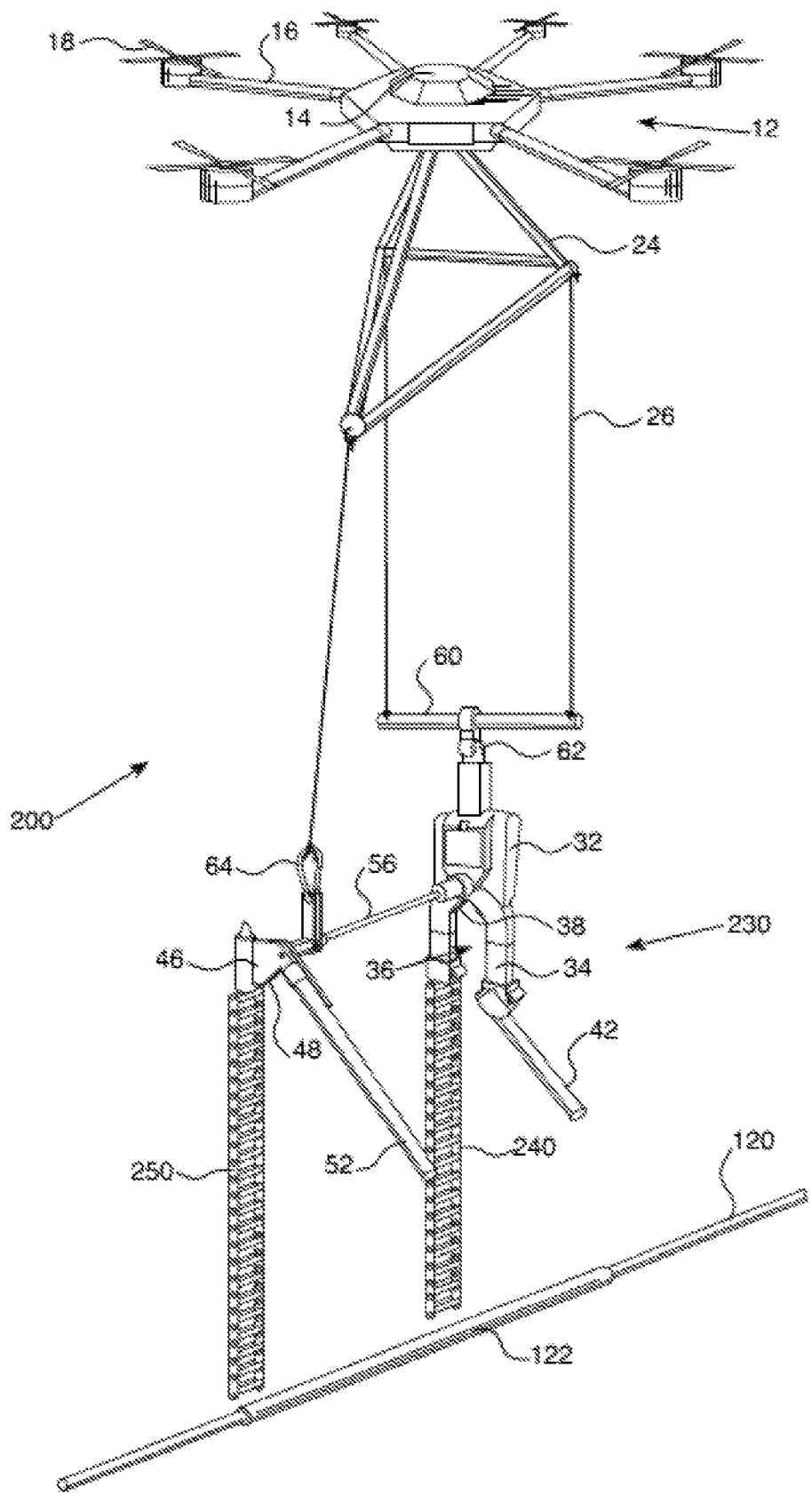
FIG. 7 is a perspective view of a system for contact inspection of electrical power lines, on approach to a power line, in accordance with alternative embodiments of the invention.

Referring now to FIG. 7, a system 200 for performing work (including contact inspection, repair, or any other suitable work tasks that may be performed) on an electrical power line 120 and/or a splice 122 on the electrical power line 120 is illustrated in accordance with an alternative exemplary embodiment of the invention. The system 200 is nearly identical to the system 10 of FIG. 1, except that the elongated guide 240 extending downward from the first side of the front section 32 and the elongated guide 250 extending downward from the first side of the rear section 46 are flexible rather than rigid. In one exemplary embodiment, the elongated guide 240 and the elongated guide 250 include a suitable length of Snap-Together Cable and Hose Carrier from McMaster-Carr. Such flexible guides help guide the power line tool 230 onto the power line 120 and/or the splice 122, just as the rigid guides described above do. But the flexible guides perform differently during an emergency release of the power line tool when the power line tool is perched on the line. In such an emergency release, the flexible guides 240, 250 would "snake" off the line as the weight of the support frame pulls the power line tool off the line (whereas the rigid guides swing up into the air gap between lines). This "snaking" feature is especially desirable when the system is working on a power line that is in close proximity to one or more other power lines (such as bundled conductor lines where the lines are typically less than two feet apart.

In the above-described embodiments, flexible dielectric support lines 26 span from the support frame 24 to the tool 30 (or any other suitable tool). Having fully flexible support lines between the support frame and the tool may be problematic in some situations. The fully flexible support lines may allow too much movement of the tool relative to the UAV during flight. Additionally, the fully flexible support lines may snag on the power line during the course of work and/or after an emergency release of the tool. FIGS. 8-10 and FIGS. 11-14 illustrate alternative mechanisms for supporting the tool.

Figure 8:
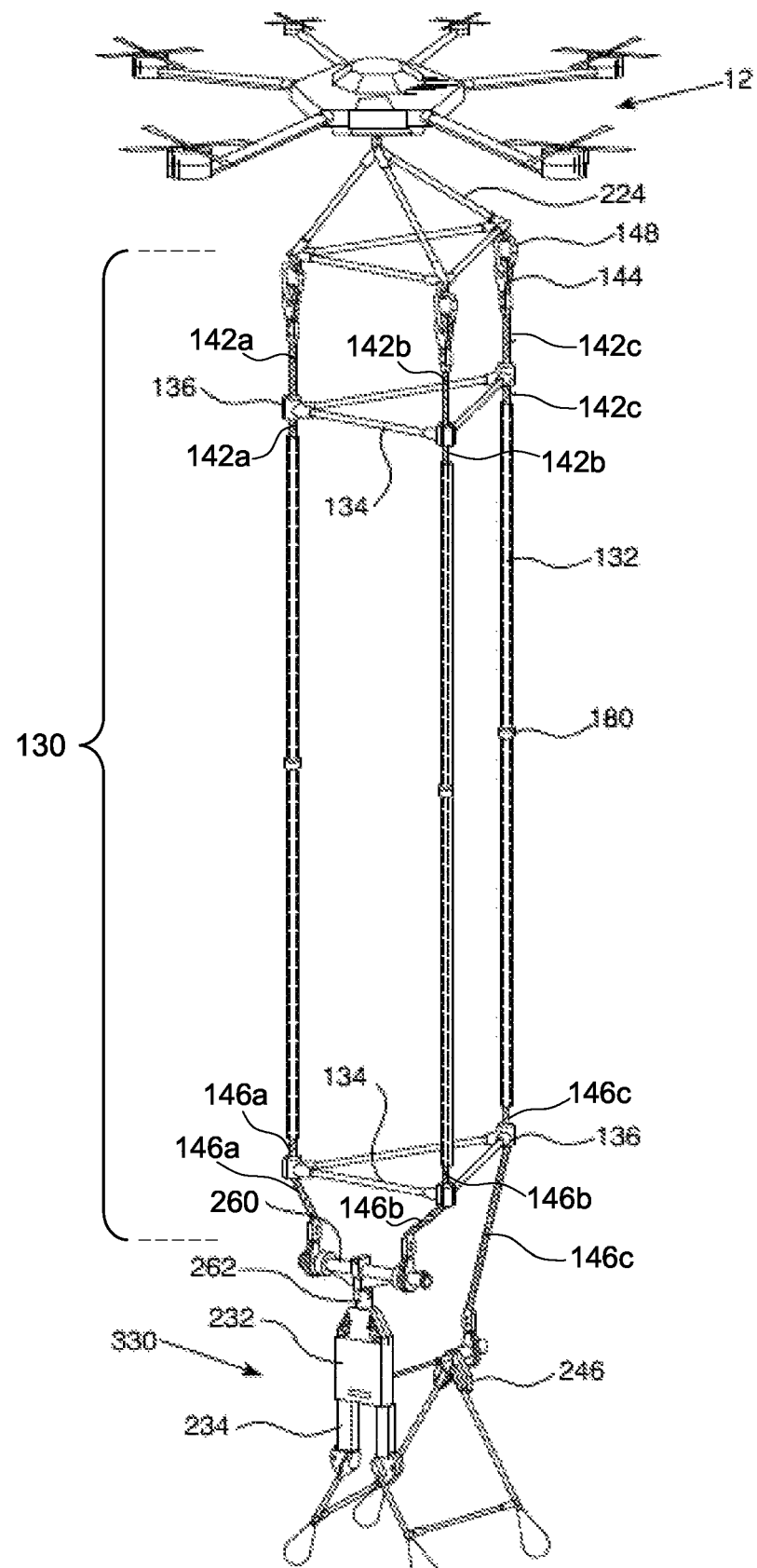
FIG. 8 is a perspective view of a system for contact inspection of electrical power lines, using a payload support frame, in accordance with embodiments of the invention.
Figure 9:
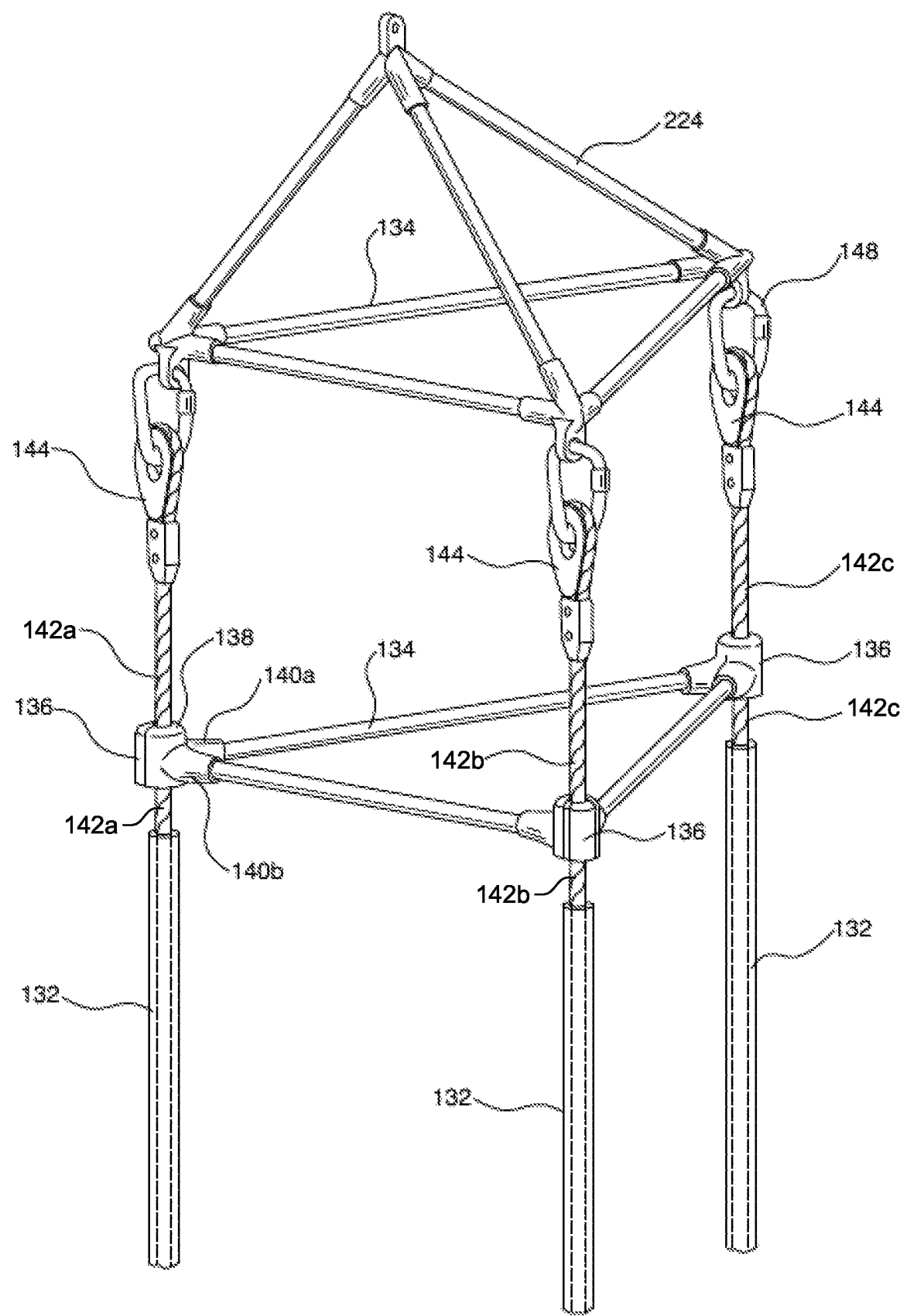
FIG. 9 is a close-up perspective view of the upper end of the payload support frame of FIG. 8.
Figure 10:
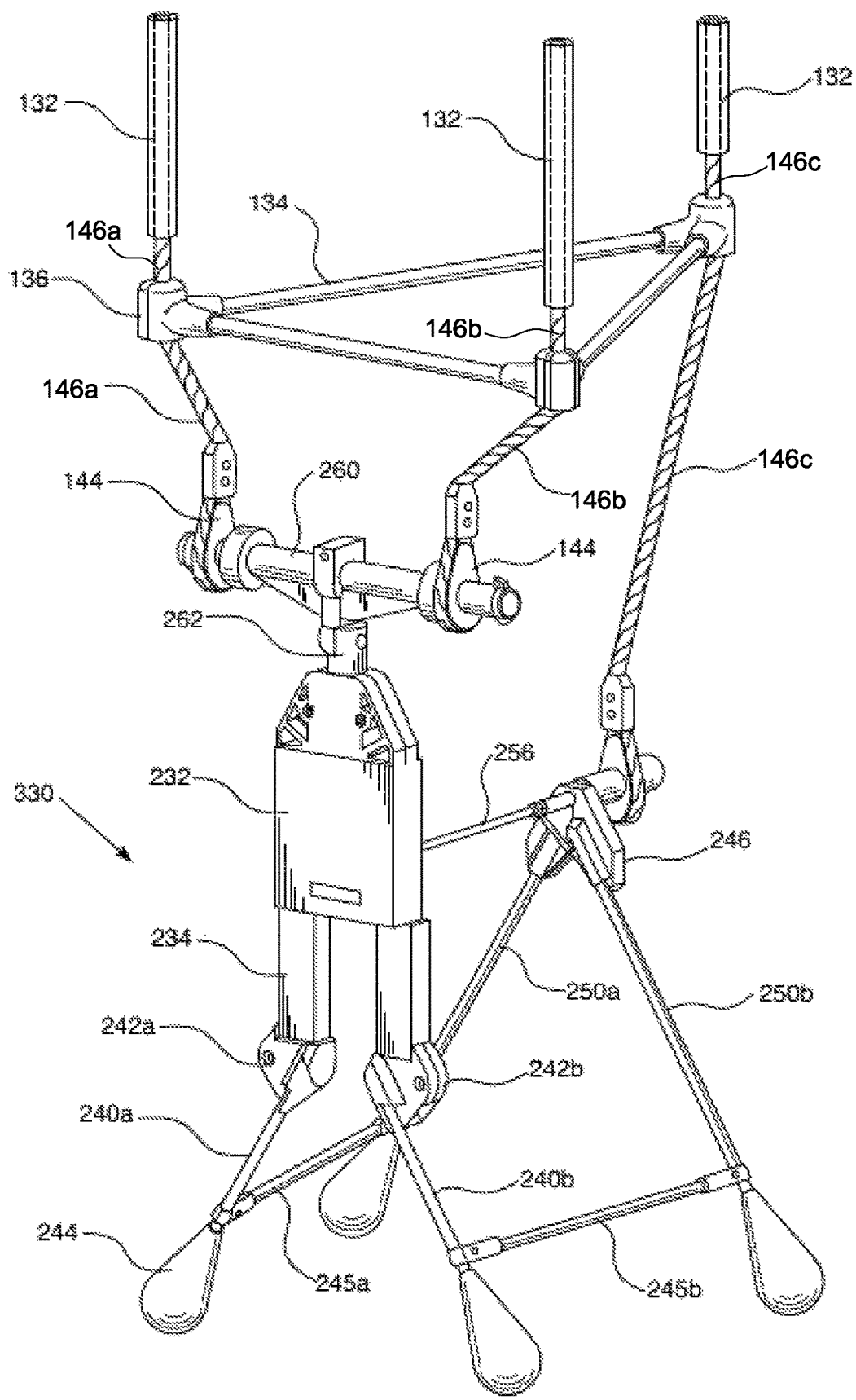
FIG. 10 is a close-up perspective view of the lower end of the payload support frame of FIG. 8.

FIGS. 8-10 illustrate a semi-rigid payload support frame 130 supported in flight by a UAV 12 via an intermediary support frame 224. (The payload support frame 130 may be termed a "lower support frame" while the support frame 224 may be termed an upper support frame. The support frame 224 of FIGS. 8-10 is very similar to the support frame 24 of FIGS. 1-7. The main difference between the support frame 224 of FIGS. 8-10 and the support frame 24 of FIGS. 1-7 is that the support frame 224 has mounting holes (not labeled) at each lower corner to accept a carabiner 148 for selectively attaching the payload support frame 130 to the support frame 224.) The payload support frame 130 includes a plurality of elongated rigid vertical poles 132 (as seen in FIG. 8, the poles 132 of the payload support frame 130 are substantially vertical when attached to a UAV in flight), a plurality of horizontal poles 134 at both the upper and lower ends of the poles 132, and a plurality of joints 136 connecting the vertical poles 132 and the horizontal poles 134 at both the upper and lower ends of the poles 132. In the illustrated embodiment, there are three vertical poles 132 and six horizontal poles 134 (three at each end of the vertical poles 132), such that the horizontal poles 134 at each end form a triangle and the overall shape of the payload support frame 130 is a triangular prism (although the prism shape is not completely rigid, as described below). In the illustrated embodiment, two of the horizontal poles 134 in each of the opposite end groupings are equal length and the third is a different length than the other two, such that the horizontal poles at each end form an isosceles triangle. In alternative embodiments of the invention, the horizontal poles are equal length such that the horizontal poles at each end form an equilateral triangle. Alternative embodiments of the invention may include four vertical poles and eight horizontal poles (four at each end) such that the horizontal poles at each end form a rectangle and the overall shape of the payload support frame is a rectangular prism.

There are three joints 136 at each end of the payload support frame 130. As best seen in FIGS. 9 and 10, each joint 136 includes a vertical tube 138 that is open at both ends and two horizontal tubes 140*a*, 140*b* projecting perpendicularly from the side of the vertical tube 138 and having open distal ends. Each horizontal tube 140*a*, 140*b* receives an end of a corresponding one of the horizontal poles 134, which is secured together using any suitable mechanism or method, to hold the horizontal poles 134 in the triangular arrangement. Each end of the horizontal poles 134 is secured in the corresponding horizontal tube 140*a*, 140*b*, such that the triangular shapes are rigidly maintained. The angle between the horizontal tubes 140*a*, 140*b* of each joint 136 establishes the angles of the triangles formed by the horizontal poles 134.

The payload support frame 130 further comprises a plurality of upper flexible dielectric support lines 142*a-c*, a plurality of lower flexible dielectric support lines 146*a-c*, where one upper support line 142 and one lower support line 146 correspond to a vertical pole 132. Each end of each upper support line 142 has any suitable attachment mechanism 144 for attaching one end of each line to a UAV (such as via a frame 224) and the other end to a tool. In the illustrated embodiment, each end of each upper support line 142 has a loop formed in a conventional manner using a thimble and a rope clamp (not labeled). The thimbles each have a hole for receiving a carabiner 148 at the upper end and a portion of the power line tool 330 at the lower end. In one embodiment of the invention, each upper support line 142 runs through the vertical tube 138 of a corresponding joint 136 at one end of the payload support frame 130, through a corresponding one of the vertical poles 132, and through the vertical tube 138 of a corresponding joint 136 at the opposite end of the payload support frame 130. A suitable length (about 18 inches in the illustrated embodiment) of each upper support line 142 extends beyond the corresponding end of the payload support frame 130. Importantly, each end of each vertical pole 132 is not rigidly affixed to its corresponding joint 136. Rather, the support lines 142*a-c* running between each joint 136 and each corresponding vertical pole 132 (best seen in FIGS. 9 and 10) provides a flexible connection between each end of each vertical pole 132 and the corresponding joint 136. In the illustrated embodiment, each vertical pole comprises two telescoping sections to reduce (by nearly half) the length of the payload support frame 130 for easy transport and storage of the device. A flip-lok collar 180 or the like locks to hold the two sections in relative position and unlocks to enable the two sections to telescope together for storage or apart for use.

Any suitable mechanism or method may be used to secure each support line 142 to each corresponding joint 136 such that the upper support line 142 does not slide within the vertical tube 138 of its corresponding joints 136. In one exemplary embodiment, a booster clamp is secured to each support line and then glued to the corresponding joint.

In a preferred embodiment, each lower support line 146*a-c* is continuous from the attachment mechanism 144 at one end to the attachment mechanism 144 at the opposing end. In an alternative embodiment (not illustrated), each upper support line 142 and each lower support line 146 comprises two discontinuous support line segments. Each support line segment spans from an attachment mechanism at one end, through a corresponding joint 136, and partway (e.g., about 6-12 inches) into a corresponding end of a corresponding vertical pole 132. The end of each support line segment within the vertical pole (which may be termed "internal ends") must be secured to the vertical pole using any suitable mechanism or method. Thus, there is a gap between the internal ends of corresponding support line segments within a corresponding vertical pole. Such a gap reduces the length of support line material needed and may therefore reduce the total cost and, importantly, the total weight of the payload support frame.

The semi-rigid payload support frame of embodiments of the invention provides a mechanism for supporting a payload from a UAV or other aerial platform, with reduced motion and increased stability as compared to using only flexible support lines as described above and shown in FIGS. 1-7. The semi-rigid payload support frame of embodiments of the invention is also less likely to snag on the power line during the course of work and/or after an emergency release of the tool. The semi-rigid payload support frame of embodiments of the invention can collapse for easier transport. The semi-rigid payload support frame of embodiments of the invention allows some twisting movement, but the twisting movement is limited as compared to using only flexible support lines.

As with the flexible support lines as described above and shown in FIGS. 1-7, the length of the payload support frame of embodiments of the invention is selected to maintain a sufficient distance between the UAV and the power line to prevent damage to the UAV from the electromagnetic fields surrounding such high-voltage power lines. In the illustrated embodiment of FIGS. 8-10, the vertical poles are about 12 feet long (when extended) and the overall length of the payload support frame (from the attachment mechanisms 144 on one end to the attachment mechanisms 144 on the opposing end) is about 15 feet long. The length of the vertical poles may be selected to provide the desired distance between the UAV and the power line. In another embodiment for lower voltage power lines for which a smaller distance between the UAV and the power line is needed, the vertical poles are about 6 feet long (when extended) and the overall length of the payload support frame (from the attachment mechanisms on one end to the attachment mechanisms on the opposing end) is about 9 feet long.

The payload support frame of embodiments of the invention may be used to support and carry any suitable tool. In the embodiment of FIGS. 8-10, the payload support frame 130 carries a contact inspection tool 330. The contact inspection tool 330 is and functions very similar to the contact inspection tool 30 of FIGS. 1-6 and has a front section 232, a rear section 246, and an elongated middle section 256 therebetween. The front section 232 has a generally U-shaped portion 234. A crossbar 260 is attached to the front section 232 via a connector 262. The contact inspection tool 330 further includes first and second elongated front guides 240a, 240b attached to the U-shaped portion 234 of the front section 232 via connectors 242a, 242b and extending downward and outward therefrom. The connectors 242a, 242b, and other connectors described herein may be cotter pins or similar type of connectors. The contact inspection tool 330 further includes first and second elongated rear guides 250a, 250b extending downward and outward from the rear section 246. First and second reinforcing bars 245a, 245b extend, respectively, from the first elongated front guide 240a to the first elongated rear guide 250a and from the second elongated front guide 240b to the second elongated rear guide 250b to add rigidity to the tool. Teardrop-shaped weights 244 are affixed to the distal ends of the first and second elongated front guides 240a, 240b and the first and second elongated rear guides 250a, 250b to improve stability. The guides 240a, 240b, 250a, 250b help guide the contact inspection tool 330 into the correct position as the contact inspection tool 330 is lowered onto the power line 120 and/or the splice 122 (i.e., such that the tool 330 rests on the power line 120 and/or the splice 122 with the electrical contact portions (not visible) in contact with the power line 120 and/or the splice 122).

As seen in FIGS. 8 and 10, the contact inspection tool 330 is supported by the payload support frame 130 by attaching two of the lower support lines 146a and 146b to opposite ends of the crossbar 260 and the lower support line 146c to a distal end of the elongated middle section 256.

In the above-described embodiments of FIGS. 8-10, an intermediary support frame 224 (also referred to as an upper support frame) is utilized to connect each of the three plurality of flexible dielectric support lines 142 to the UAV 12. Having the intermediary support frame 224 may be problematic in some situations and may allow too much movement of the tool relative to the UAV during flight. FIGS. 11-14 illustrate alternative mechanisms for supporting the contact inspection tool 330 of FIGS. 8-10, connecting the contact inspection tool 330 to the UAV 12, and a different structure for landing the contact inspection tool 330 onto electrical power lines.

Figure 11:
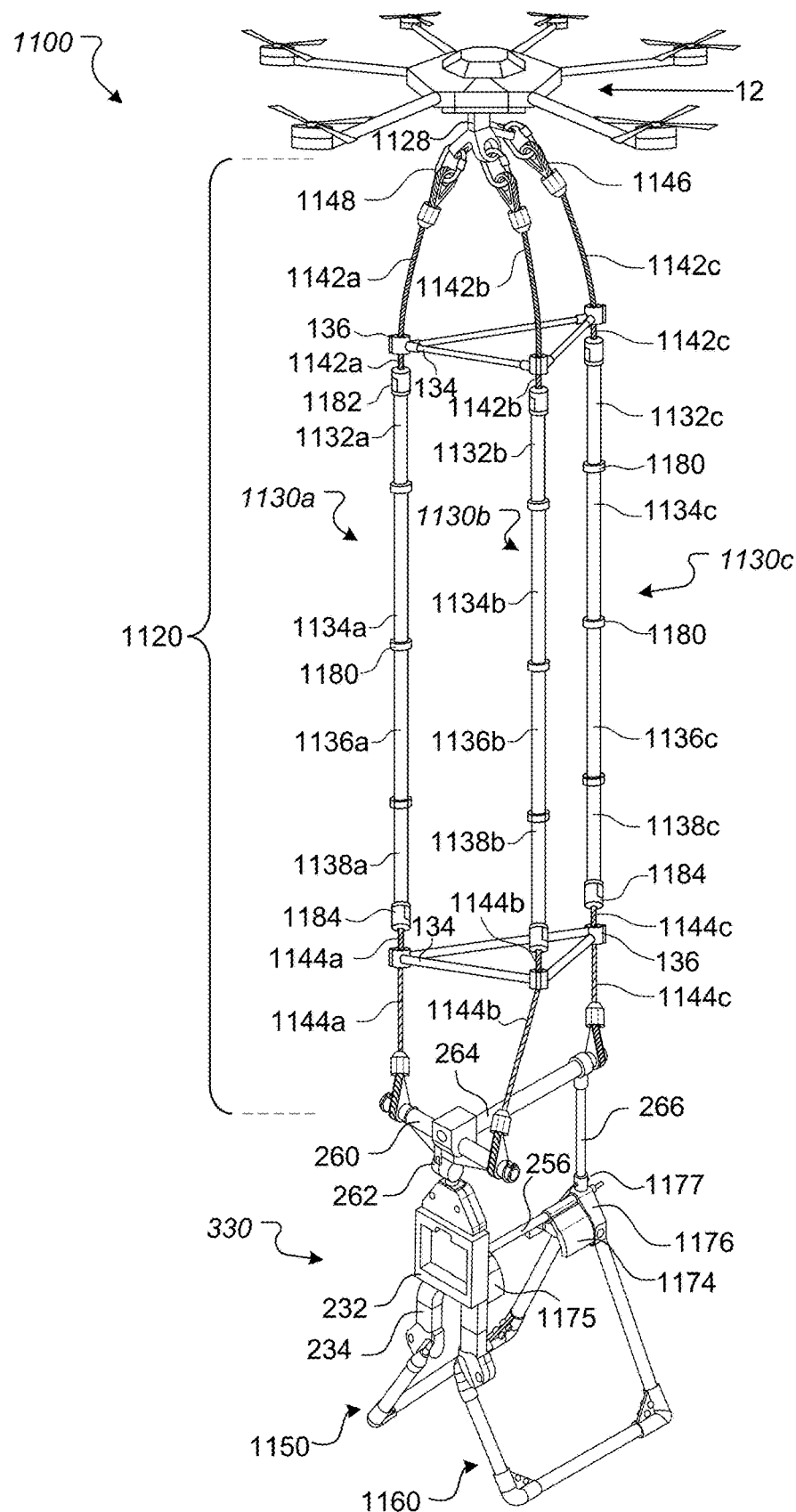
FIG. 11 is a perspective view of a system for contact inspection of electrical power lines, on approach to a power line, in accordance with embodiments of the invention.
Figure 12:
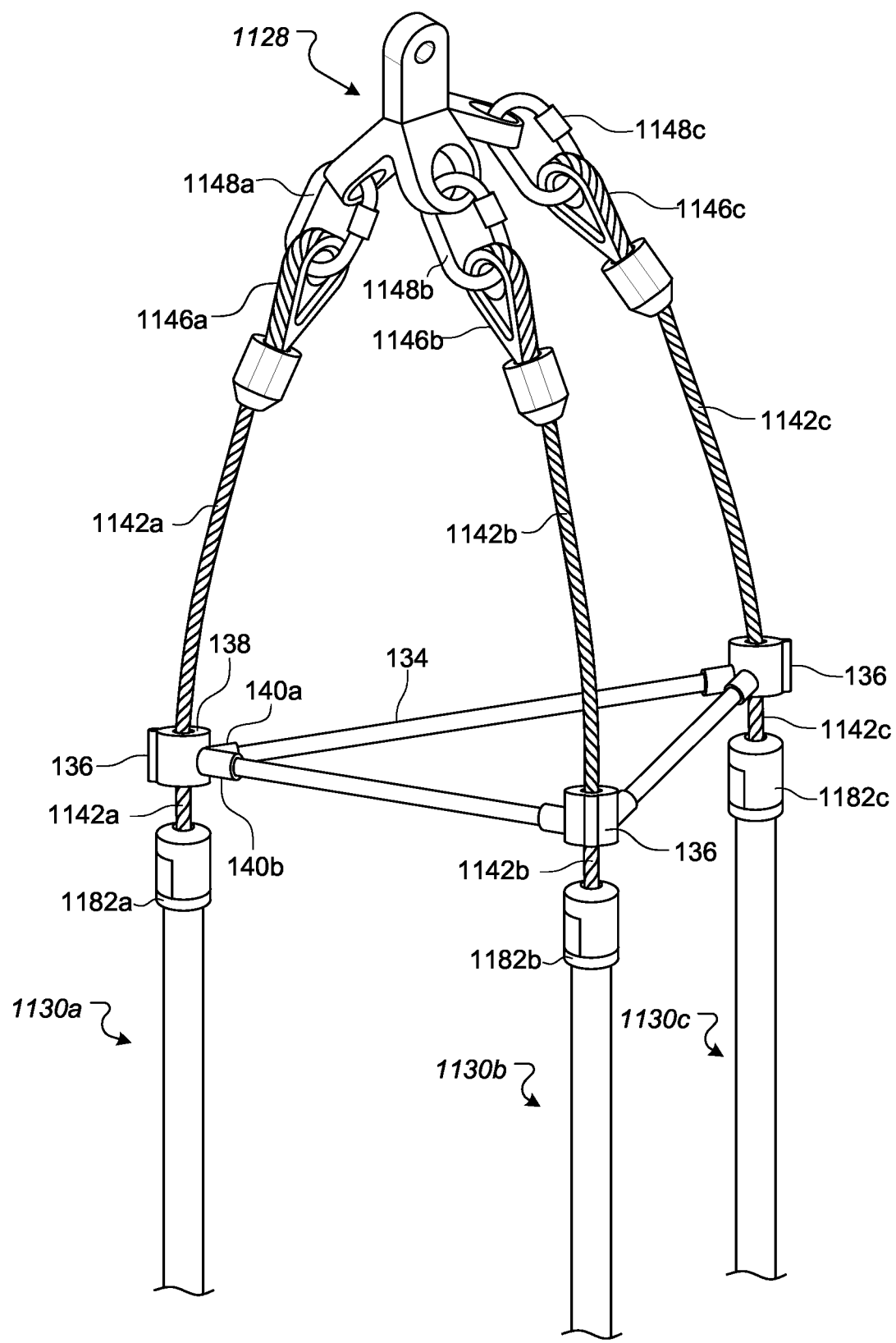
FIG. 12 is a perspective view of a support frame of the system of FIG. 11.
Figure 13:
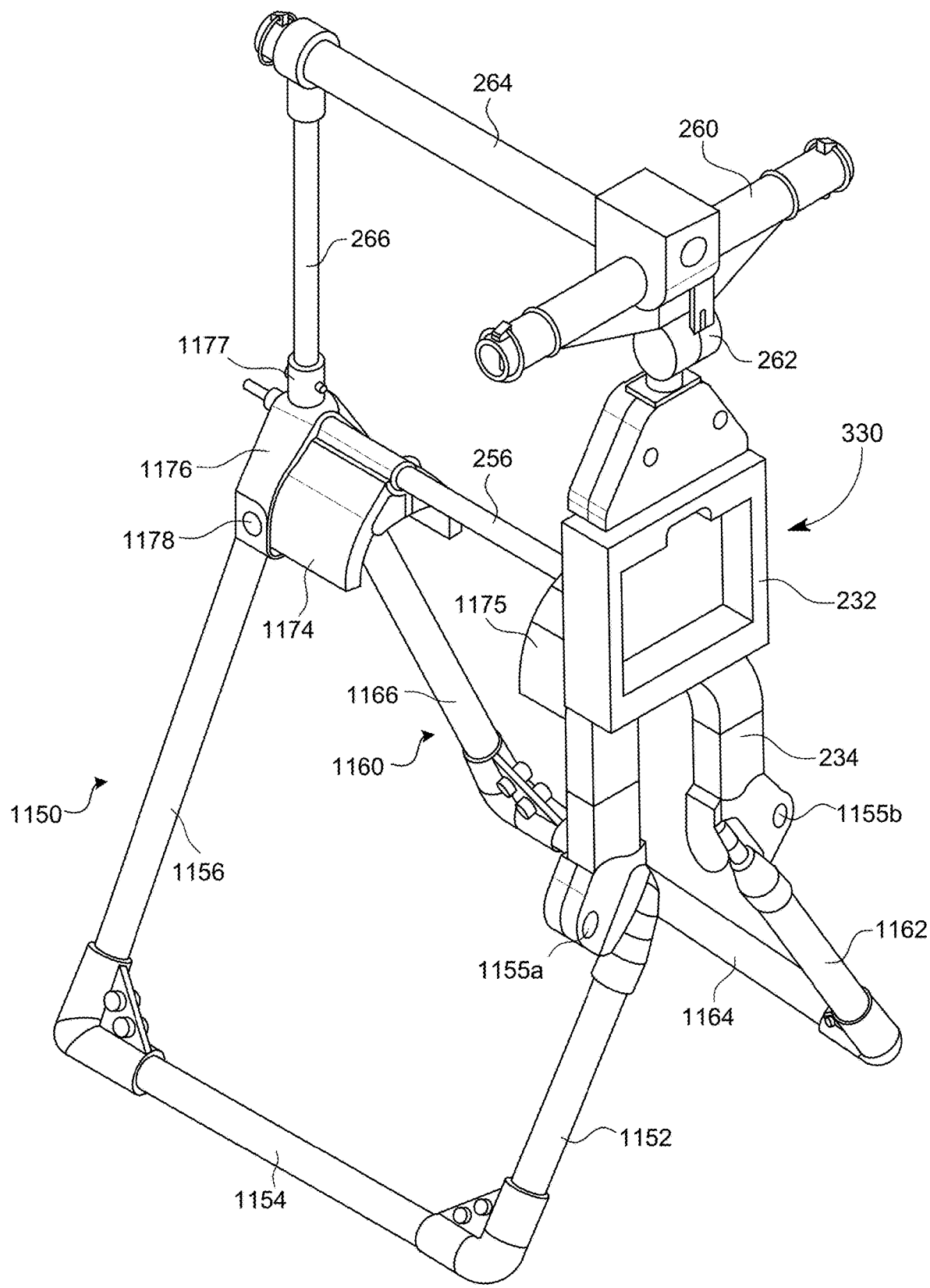
FIG. 13 is a close-up perspective view of the lower end of the payload support frame of FIG. 11.
Figure 14:
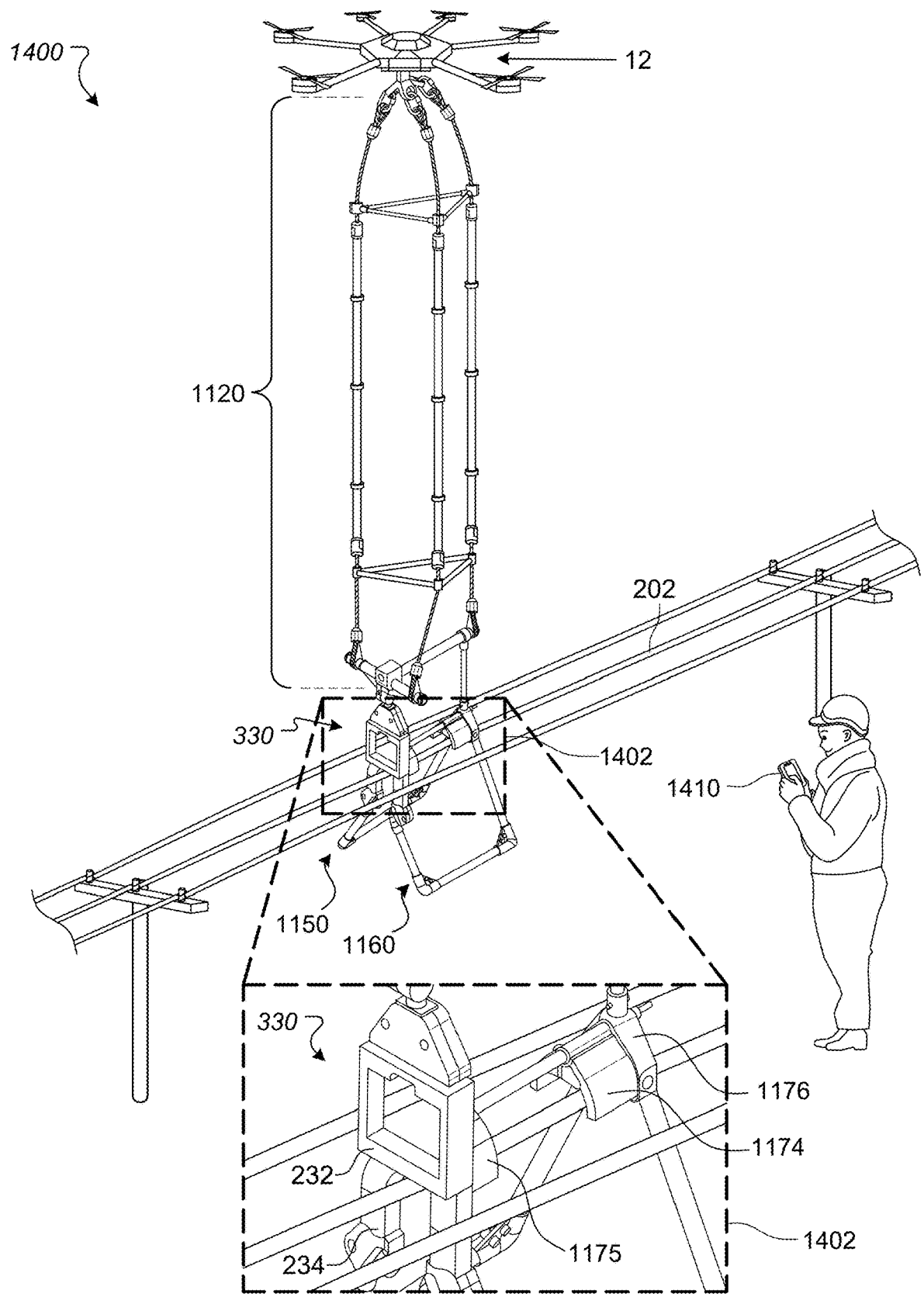
FIG. 14 illustrates a view of operating the system for contact inspection of electrical power lines of FIGS. 11-13 with thane aerial system.

FIGS. 11-14 illustrate the contact inspection tool 330 connected to a semi-rigid payload support frame 1120 and supported in flight by a UAV 12. FIG. 11 is a perspective view of a power line system 1100 for contact inspection of electrical power lines (e.g., while the UAV 12 is on approach to a power line). FIG. 12 is a perspective view of the semi-rigid payload support frame 1120 of the power line system 1100 of FIG. 11. FIG. 13 is a close-up perspective view of the contact inspection tool 330 of FIG. 11. FIG. 14 illustrates a view of an operating environment 1400 for using an aerial power line system 1100 of FIGS. 11-13 for contact inspection of electrical power lines.

The semi-rigid payload support frame 1120 of FIGS. 11-14 is comparable to the semi-rigid payload support frame 130 of FIGS. 8-10, however, there are some different mechanisms for supporting the contact inspection tool 330. One difference is that the semi-rigid payload support frame 1120 is directly connected to the UAV 12 via a UAV attachment flange 1128. For example, a carabiner 1148 is attached to an end of an upper support line 1142 via an attachment mechanism 1146. Additionally, each carabiner 1148a-c is directly attached to the UAV attachment flange 1128. The UAV attachment flange 1128 is coupled to the UAV 12, thus the intermediary support frame 224 of previous embodiments (e.g., the upper support frame) is no longer necessary, which may help prevent swinging and entanglement of the entire system. A closer view of the attachment flange 1128 and the connections to each carabiner 1148a-c of each corresponding upper support line 1142a-c via a corresponding attachment mechanism 1144a € 1146a-c is illustrated in FIG. 12.

Another difference compared to the semi-rigid payload support frame 130 is that the semi-rigid payload support frame 1120 includes upper support lines 1142a-c and lower support lines 1144ac that each terminate at a respective end of the corresponding vertical poles 1130a-c. Therefore, instead of the telescoping vertical poles 132 of FIGS. 8-10, each of the vertical poles 1130 include one or more interconnecting pole segments. For example, as illustrated in FIG. 11, vertical pole 1130a includes pole segments 1132a, 1134a, 1136a, and 1138a, vertical pole 1130b includes pole segments 1132b, 1134b, 1136b, and 1138b, and vertical pole 1130b includes pole segments 1132b, 1134b, 1136b, and 1138b. In some embodiments, two adjacent pole segments (e.g., pole segments 1134a and 1136a) may be threaded directly together based on male/female threaded ends. Alternatively, in some embodiments, and as illustrated in FIG. 11, two adjacent pole segments (e.g., pole segments 1134a and 1136a) may be threaded together using a threaded attachment collar 1180. For example, each pole segment (e.g., pole segments 1134a and 1136a) may have male threaded ends and may be connected to together via a threaded attachment collar 1180 with a female threaded inside. In some embodiments, the upper pole segments of the vertical poles 1130a-c (e.g., pole segments 1132a-c) are connected to the upper support lines 1142a-c, respectively, via an upper joint 1182 (e.g., a threaded connector). Similarly, in some embodiments, the lower pole segments of the vertical poles 1130a-c (e.g., pole segments 1138a-c) are connected to the lower support lines 1144a-c, respectively, via a lower joint 1184 (e.g., a threaded connector).

In some embodiments, each of the pole segments (e.g., pole segments 1132a-c, 1134a-c, 1136a-c, and 1138a-c) are interchangeable threaded segments that can be added and/or removed, and each pole segment may include different lengths. Therefore, the overall length of the payload support frame 1120 may be adjusted based on the interchangeability of the plurality of pole segments for each vertical pole 1130a-c. In the illustrated embodiment, each vertical pole 1130a-c includes interchangeable sections (e.g., pole segments 1132a-c, 1134a-c, 1136a-c, and 1138a-c) to reduce the length of the payload support frame 1120 for easy transport and storage of the device. In some embodiments, the threaded attachment collar 1180 (or similar attachment components such as a direct male/female threaded connection between pole segments) may hold the pole segments in relative position and may unlock to enable each of the pole segments for each vertical pole 1130a-c to be removed for storage or for use (e.g., removing one section for each vertical pole 1130a-c to reduce the overall length of the payload support frame 1120). One advantage of this modular system with the interchangeability of the plurality of pole segments may be utilized if one modular portion (e.g., a pole segment) breaks, starts to gain conductivity, is damaged, etc., it will be easy to swap out one or more of the pole segments.

In some implementations, each pole segment for each vertical pole 1130a-c (e.g., pole segments 1132a-c, 1134a-c, 1136a-c, and 1138a-c) may be the same length or may be variable lengths depending on the need of the system (e.g., distance required for the particular voltage current of the power line being tested), and each segment may be adjusted accordingly for the variable lengths. For example, it is typically desirable that the length of the payload support frame 1120 be long enough to maintain a sufficient distance between the UAV 12 and the power line to prevent damage to the UAV 12 from the electromagnetic fields surrounding such high-voltage power lines. In this regard, the length of each pole segment for each vertical pole 1130a-c (e.g., pole segments 1132a-c, 1134a-c, 1136a-c, and 1138a-c) of the payload support frame 1120 may be selected based on the voltage of the power line upon which the contact inspection tool 330 is to be perched (based on the live-line work approach distances set forth in the National Electrical Safety Code). For example, if the voltage of the power line is 145 kilovolts (kV), then the length of the payload support frame 1120 should be at least five feet, four inches to maintain the desired spacing between the UAV 12 and a power line. As another example, if the voltage of the power line is 362 kV, then the length of the payload support frame 1120 should be at least thirteen feet, six inches. Additionally, the UAV 12 should be a minimum of twenty feet from the highest structure point (which may be a shield or static line) when working on a power line. In most cases there is some charge in the shield line which runs above the energized phases, so the UAV 12 should be kept above those. The vertical poles 132 may be constructed from any suitable non-conductive material or combination of non-conductive materials that is sufficiently strong, sufficiently rigid, and sufficiently lightweight, such a suitable polymer, a glass-epoxy composite, or the like.

In comparison to the connections to the contact inspection tool 330 as illustrated in FIGS. 8-10, the semi-rigid payload support frame 1120, as illustrated in FIGS. 11 and 13, also connects to the contact inspection tool 330 via crossbar 260 which is attached to the front section 232 of the contact inspection tool 330 via a connector 262. However, the semi-rigid payload support frame 1120 connects to a rear section 1176 of the contact inspection tool 330 via vertical bar 266 (e.g., as part of a base frame). For example, the crossbar 264 connects to the crossbar 260 via connector 262, and the crossbar 264 connects to the lower support line 1144c and connects to the rear section 1176 of a base frame that connects to the contact inspection tool 330 and connects to the crossbar 264 via the vertical bar 266. The rear section 1176 is similar to the rear section 246 of the contact inspection tool 330, but rear section 1176 includes a connector 1177 for connecting to the vertical bar 266. Moreover, FIGS. 11, 13, and 14 illustrate the rear section 1176, the front section 232, and the elengated middle section 256 therebetween. The elongated middle section 256 includes the first U-shaped section 1174 and a second U-shaped section 1175 that each include side portions that extend outwardly from the elongated middle section 256.

FIGS. 11, 13, and 14, further illustrate a guiding apparatus connected to the contact inspection tool 330 that includes guide bars 1150 and 1160 and are u-shaped. Each guide bar, as illustrated in FIG. 13, includes three components, 1152, 1154, and 1156 for guide bar 1150 (e.g., a left guide bar), and 1162, 1164, and 1166 for guide bar 1160 (e.g., a right guide bar). Each of the guide bars 1150, 1160, may be easily detached at connectors 1178 and 1155a,b. For example, the connectors may be cotter pins or some other similar connecting mechanism. In some embodiments, each component of the guide bars 1150, 1160, may be hollow rods. The guide bars 1150 and 1160 may be constructed from any suitable non-conductive material or combination of non-conductive materials that is sufficiently strong, sufficiently rigid, and sufficiently lightweight, such a suitable polymer, a glass-epoxy composite, or the like. Additionally, or alternatively, in some implementations, each component of the guide bars 1150, 1160, may include additional nonferrous material such as copper (e.g., nonmagnetic material) that can act like weights to balance the contact inspection tool 330 so it can stand vertically on a power line, moving the center of mass for the contact inspection tool 330 below where the contact inspection tool 330 accepts the power line. Therefore, additional weights, such as the teardrop-shaped weights 244 of the previous embodiments, may not be necessary.

FIG. 14 illustrates the system 1100 of FIG. 11 (e.g., UAV 12, semi-rigid payload support frame 1120, contact inspection tool 330, guide bars 1150, 1160, etc.) landing (e.g., lowering, etc.) the contact inspection tool 330 (e.g., a power line sensor or the like), onto or on top of the power line 202 via the UAV 12, as illustrated in the expanded area 1402. As the contact inspection tool 330 is lowered down onto a power line 202 by the UAV 12, the power line 202 enters the space between the two non-conductive guide bars 1150, 1160. The operator of the UAV can then further lower the UAV 12 until the contact inspection tool 330 has both ends resting (touching) the power line 202 at two different points or areas (e.g., the front section 232 and the second U-shaped section 1175 at a first area (front end), and the first U-shaped section 1174 and the rear section 1176 at a second area (back end)). example, the contact inspection tool 330 measure a resistance between two points on a power line, typically both ends are placed on the conductor, or have one end on the conductor and one end on a compression connector. Moreover, the contact inspection tool 330 may be providing data (e.g., measurement data, such as a resistance measurement of the power line 202 between the two contact points) to the electronic device 1410 (e.g., via a communication module).

Embodiments of the invention may further include methods for using a UAV 12 to deliver and land a tool or similar device (e.g., contact inspection tool 30, power line tool 230, contact inspection tool 330, etc.) on an electrical power line and/or on a splice on an electrical power line, while the UAV 12 maintains flight and does not itself land on the power line and/or splice. Such methods may include some or all of the following steps. The airborne portion of the system (such as is illustrated in FIGS. 1-14) is assembled and readied for use, along with a ground perch (such as is illustrated in FIG. 5) if one is to be used. For the airborne portion, a support frame is attached to a UAV 12 via a payload release mechanism, a power line tool is attached to the support frame via a plurality of flexible dielectric support lines, and the power line tool is activated. For the ground perch, the support structures are erected and positioned to support the landing bar in a substantially horizontal position and a height at which there will be sufficient slack in the support lines when the support frame is released from the UAV at the end of the mission so that the power line tool is not pulled off the landing bar. The feet of the support structures (especially the conductive foot to which the ground wire is attached) are pushed down into the ground to stabilize the support structures.

The UAV is piloted to a position adjacent to and higher than the electrical power line and/or the splice on an electrical power line upon which it is desired to perch the power line tool. In some implementations, as illustrated in the embodiments of FIGS. 1-10, the UAV 12 is piloted laterally until a first elongated guide of each of the front and rear sections of the power line tool (e.g., contact inspection tool 30, 230, 330, etc.) contact the power line and/or the splice. Alternatively, in some implementations, as illustrated in the embodiments of FIGS. 11-14, the UAV 12 is piloted laterally until the power line is between the space between the u-shaped guide bars (e.g., guide bars 1150, 1160) connected to the front and rear sections of the power line tool (e.g., contact inspection tool 330). Then, in either embodiment described herein, the altitude of the UAV 12 may be reduced to lower the power line tool (contact inspection tool 30, 230, 330, etc.) onto the power line and/or the splice such that the power line tool is perched on the power line and/or the splice. The altitude of the UAV is further reduced to introduce slack into the support lines, which helps prevent small in-flight movements of the UAV from pulling the power line tool off the line. While the power line tool is perched on the line and the UAV is hovering near by, the power line tool performs whatever action (e.g., inspection, repair, measure, etc.) that it is designed to perform. If the power line tool needs to be repositioned on the power line to perform its work, the UAV is piloted appropriated to drag or lift and move the power line tool to a new position to continue/complete the work.

If there is an emergency while the power line tool is perched on the power line, the UAV pilot may activate the payload release mechanism to detach the support frame from the UAV. The support frame will fall to the ground and will pull the power line tool off the line so that the power line tool will also fall to the ground. The combined weight of the support frame and the support lines is selected to be sufficient to pull the power line tool off the power line when the support frame is detached from the UAV. Additionally, the semi-rigid nature of the design allows the apparatus to collapse and fall in between conductors during a release.

After the work of the power line tool is completed, the altitude of the UAV is increased to lift the power line tool off of the power line and the UAV is piloted to a position adjacent to and higher than the ground perch. The altitude of the UAV is reduced to lower the power line tool onto the landing bar of the ground perch such that the power line tool is perched on the landing bar of the ground perch. The altitude of the UAV is then further reduced to introduce slack into the support lines and the UAV is piloted laterally apart from the ground perch. The payload release mechanism is activated to detach the support frame from the UAV, and the support frame will fall to the ground adjacent the ground perch. The falling support frame will not pull the power line tool off the ground perch, due to the height of the landing bar being less than the length of the support lines. The UAV may then be landed at a safe distance from the ground perch. Any electrical charge on the power line tool will be dissipated through the ground perch and the power line tool may be removed from the ground perch by a user.

In some embodiments of the invention, a system (e.g., system 100, system 1100, etc.) may be utilized for performing work (including measurement, contact inspection, repair, or any other suitable work tasks that may be performed) on an electrical power line and/or a splice on the electrical power line. The system may include an unmanned aerial vehicle (UAV) (e.g., UAV 12), a power line tool (e.g., contact inspection tool 30, 230, 330, etc.) adapted to perch on the power line and/or the splice, a support frame (e.g., support frame 1120) selectively releasably attached to the UAV 12, a plurality of flexible dielectric support lines as part of the support frame (e.g., upper support lines 1142a-c, lower support lines 1144a-c, etc.), and a plurality of elongated rigid vertical poles (e.g., vertical poles 1130a-c) attaching the power line tool to the support frame. Three flexible upper dielectric support lines 1142 and three flexible lower dielectric support lines 1144 are shown, although more or fewer may be used; however, fewer cables may not provide stable support for the tool during flight. Each of the upper support lines 1142 and lower support lines 1144 may be attached to a corresponding attachment point on a support frame and a corresponding attachment point on the power line tool (e.g., attachment points on the crossbar 260 or the crossbar 264).

The UAV 12 may be any suitable remotely piloted aircraft, typically multi-rotor, with sufficient payload capacity to carry the support frame, support lines, and power line tool. In the illustrated embodiments, UAV 12 includes a main body and six rotors supported by corresponding rotor support arms (any suitable number of rotors may be used). As is conventionally known, the UAV 12 may be controlled in flight by an operator or pilot using a controller (e.g., device 1410). The UAV 12 may have retractable landing gear (not illustrated).

In some illustrated embodiments (e.g., FIGS. 1-8), an upper support frame (e.g., upper frame 24, 224) may be generally pyramidal, providing two front attachment points and one rear attachment point for the support lines. However, any suitable support frame structure may be used. Having at least three attachment points provides more stability to the tool during flight than having only one or two attachment points. The number, position, and arrangement of the attachment points may vary. The support lines may be attached to the support frame in any suitable manner or with any suitable mechanism, and may be removably attached or fixedly attached. The support frame may be constructed from any suitable non-conductive material or combination of non-conductive materials that is sufficiently strong, sufficiently rigid, and sufficiently lightweight, such a suitable polymer, a glass-epoxy composite, or the like. It may be optimal to have no support frame beyond flexible cables or ropes terminating at a single central UAV attachment flange.

In some embodiments (e.g., FIGS. 1-7), an upper support frame (e.g., upper frame 24) includes a UAV attachment flange (e.g., UAV attachment flange 28). Alternatively, in some embodiments (e.g., FIGS. 8-10), an upper support frame (e.g., upper frame 224) is connected to a support frame (e.g., payload support frame 130), and includes a UAV attachment flange (e.g., UAV attachment flange 28). For each of these embodiments, the UAV attachment flange (e.g., UAV attachment flange 28) may be generally aligned with the central front-to-back axis of the support frame. Alternatively, in some embodiments (e.g., FIGS. 11-14), there is no upper support frame, and a payload support frame (e.g., payload support frame 1120) is connected to the UAV directly via a UAV attachment flange (e.g., UAV attachment flange 1128). For these embodiments (e.g., no upper support frame 24, 224), the UAV attachment flange (e.g., UAV attachment flange 1128) may include an upper portion to connect to the UAV, and as illustrated in FIG. 12, include three connecting points to directly connect with the plurality of upper flexible dielectric support lines 1142 (e.g., via a carabiner 1148).

In some implementations, the UAV attachment flange may be configured to mate with a payload release mechanism that may be mounted to the underside of the main body of the UAV to enable releasable attachment of the support frame to the UAV. In one exemplary embodiment of the invention, the payload release mechanism includes any suitable payload release mechanism. The payload release mechanism may have a movable pin that selectively engages with the hole in the UAV attachment flange. The pin engages with the hole in the UAV attachment flange to couple the support frame and the UAV during normal operation of the system and disengages to release the support frame from the UAV at the end of a mission or in an emergency. The thickness of the UAV attachment flange may be selected to enable the support frame to pitch relative to the UAV but to somewhat limit yaw and roll of the support frame relative to the UAV as the UAV pitches, yaws, and rolls during flight (some yaw and roll of the support frame is acceptable to limit yaw and roll of the support frame from transferring to the UAV). The payload release mechanism may be controlled by the UAV operator.

The support lines (e.g., support lines 26, 142, 1142, 1144, etc.) may include any suitably strong and flexible material, such as ropes (natural or synthetic), metallic cables, wires, etc. In one exemplary embodiment of the invention, the support lines include Hy-Dee-Brait Hot Rope from Yale Cordage. The material selected for the support lines is typically a non-conductive (dielectric) material to prevent electricity from being conducted up the support lines to the UAV. Although it may be possible to electrically shield the critical components of the UAV, it may be desirable that the length of the support lines be long enough to maintain a sufficient distance between the UAV and the power line to prevent damage to the UAV from the electromagnetic fields surrounding such high-voltage power lines. In this regard, the length of the support lines may be selected based on the voltage of the power line upon which the tool (e.g., a power line measuring device, or the like) is to be perched (based on the live-line work approach distances set forth in the National Electrical Safety Code). In most cases there is some charge in the shield line which runs above the energized phases, so the UAV should be kept above those.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An apparatus comprising:
   an attachment flange selectively and releasably coupled to an unmanned aerial vehicle (UAV);
   a payload support frame selectively and releasably coupled to the attachment flange, wherein the payload support frame comprises:
     at least three elongated rigid segments, each elongated rigid segment comprising a hollow elongated pole;
     at least three upper flexible segments, each upper flexible segment positioned at an upper end of a corresponding rigid segment; and
     at least three lower flexible segments, each lower flexible segment positioned at a lower end of a corresponding rigid segment;
   an intermediary frame selectively and releasably coupled to the payload support frame via the at least three lower flexible segments, wherein the intermediary frame is coupled to a power line device at one or more points, wherein the power line device is configured to measure one or more properties of an electrical power line and/or a splice on the electrical power line; and a base frame selectively and releasably coupled to the power line device.

2. The apparatus of claim 1, wherein each upper flexible segment of the at least three upper flexible segments and each corresponding lower flexible segment of the at least three lower flexible segments comprise a single rope, cable, or wire and are coupled to a corresponding one of the elongated poles.

3. The apparatus of claim 1, wherein each of the elongated poles comprise one or more interconnecting pole segments.

4. The apparatus of claim 3, wherein a length of each elongated pole is adjusted based on removing, replacing, or adding one or more of the interconnecting pole segments.

5. The apparatus of claim 1, wherein a length of each elongated pole is configured to be adjusted based on an electromagnetic field of an energized electrical power line.

6. The apparatus of claim 1, wherein the base frame comprises at least two guide bars.

7. The apparatus of claim 6, wherein the guide bars each comprise of one or more segments, wherein at least a portion of each segment is hollow.

8. The apparatus of claim 7, wherein each of the one or more segments comprise a nonferrous weighted material inside the hollow portion.

9. The apparatus of claim 6, wherein the guide bars are selectively and releasably coupled to the power line device via cotter pins.

10. The apparatus of claim 1, wherein the attachment flange comprises at least three attachment points, and wherein the at least three upper flexible segments each comprise an attachment component configured to selectively and releasably connect to one of the at least three attachment points of the attachment flange.

11. The apparatus of claim 1, further comprising:

a rigid upper spacer frame configured to hold the at least three upper flexible segments, and thereby the upper ends of the corresponding rigid segments, in a spaced-apart arrangement; and a rigid lower spacer frame configured to hold the at least three lower flexible segments, and thereby the lower ends of the corresponding rigid segments, in a spaced-apart arrangement.

12. The apparatus of claim 11, wherein the at least three upper flexible segments comprise at least three first upper flexible segments;

wherein the at least three lower flexible segments comprise at least three first lower flexible segments; and wherein the apparatus further comprises:

at least three second upper flexible segments, each of the at least three second upper flexible segments on an opposite side of the upper spacer frame from a corresponding one of the at least three first upper flexible segments; and at least three second lower flexible segments, each of the at least three second lower flexible segments on an opposite side of the lower spacer frame from a corresponding one of the at least three first lower flexible segments;

wherein each of the at least three second upper flexible segments and a corresponding one of the at least three first upper flexible segments comprise a single rope, cable, or wire extending through a corresponding channel in the rigid upper spacer frame; and wherein each of the at least three second lower flexible segments and a corresponding one of the at least three first lower flexible segments comprise a single rope, cable, or wire extending through a corresponding channel in the rigid lower spacer frame.

13. The apparatus of claim 1, wherein the at least three upper flexible segments and the at least three lower flexible segments comprise a dielectric material.

14. A method for contact inspection of electrical power lines and/or splices on energized electrical power lines, the method comprising:

attaching a power line tool to an unmanned aerial vehicle (UAV) to a payload support apparatus via an attachment flange, wherein the power line tool is adapted to perch on an electrical power line and/or a splice on an electrical power line and wherein the payload support apparatus is selectively releasably attached, directly or indirectly, to the UAV;

piloting the UAV to a position adjacent to and at an altitude that is higher than an energized electrical power line and/or a splice on the electrical power line upon which it is desired to perch the power line tool;

reducing the altitude of the UAV to lower the power line tool onto the power line and/or the splice such that the power line tool is perched on the power line and/or the splice; and obtaining, by an electronic device, measurement data from the power line tool;

wherein the payload support apparatus comprises the attachment flange, a payload support frame coupled to the attachment flange, an intermediary frame coupled to the payload support frame, and a base frame coupled to the power line tool, wherein the payload support frame comprises: at least three elongated rigid segments, each elongated rigid segment comprising a hollow elongated pole; at least three upper flexible segments, each upper flexible segment positioned at an upper end of a corresponding rigid segment; and at least three lower flexible segments, each lower flexible segment positioned at a lower end of a corresponding rigid segment.

15. The method of claim 14, wherein each upper flexible segment of the at least three upper flexible segments and each corresponding lower flexible segment of the at least three lower flexible segments comprise a single rope, cable, or wire and are coupled to a corresponding one of the elongated poles.

16. The method of claim 14, wherein each of the elongated poles comprise one or more interconnecting pole segments.

17. The method of claim 16, wherein a length of each elongated pole is adjusted based on removing, replacing, or adding one or more of the plurality of interconnecting pole segments, and the length is configured to be adjusted based on an electromagnetic field of an energized electrical power line.

18. The method of claim 14, further comprising: further reducing the altitude of the UAV to introduce slack into one or more of the at least three upper flexible segments, one or more of the at least three lower flexible segments, or a combination thereof.

19. The method of claim 14, wherein the base frame comprises at least two guide bars and that each comprise of one or more segments, wherein at least a portion of each segment is hollow and comprises a nonferrous weighted material inside the hollow portion.

\* \* \* \* \*

UNITED STATES PATENT AND TRADEMARK OFFICE
CERTIFICATE OF CORRECTION

| | | |
|---|---|---|
| PATENT NO. | : 12,441,493 B2 | Page 1 of 1 |
| APPLICATION NO. | : 18/379991 | |
| DATED | : October 14, 2025 | |
| INVENTOR(S) | : Michael Kenneth Beiro et al. | |

It is certified that error appears in the above-identified patent and that said Letters Patent is hereby corrected as shown below:

In the Specification

Column 14, Line 63, reads:
"...mechanism 1144a € 1146a-c is illustrated in FIG. 12."
Should read:
"...mechanism 1146a-c is illustrated in FIG. 12."

Column 14, Line 67, reads:
"...support lines 1144ac that each terminate..."
Should read:
"...support lines 1144a-c that each terminate..."

Column 16, Lines 38, reads:
"...the elengated middle section 256..."
Should read:
"...the elongated middle section 256..."

Column 17, Line 16, reads:
"...end)). example, the contact inspection tool 330 measure a..."
Should read:
"...end)). For example, the contact inspection tool 330 measures a..."

Signed and Sealed this
Ninth Day of December, 2025

John A. Squires
*Director of the United States Patent and Trademark Office*